US012636216B2

(12) United States Patent
Arzanpour et al.

(10) Patent No.: US 12,636,216 B2
(45) Date of Patent: May 26, 2026

(54) SELF-SUPPORTED DEVICE FOR GUIDING MOTIONS OF A PASSIVE TARGET SYSTEM

(71) Applicant: Human In Motion Robotics Inc., North Vancouver (CA)

(72) Inventors: Siamak Arzanpour, North Vancouver (CA); Jung Wook Park, Surrey (CA); Liam Page, Surrey (CA); Hossein Dehghani, North Vancouver (CA); Nikita Bazhanov, Coquitlam (CA)

(73) Assignee: HUMAN IN ROBOTICS INC., North Vancouver (CA)

( * ) Notice: Subject to any disclaimer, the term of this patent is extended or adjusted under 35 U.S.C. 154(b) by 1163 days.

(21) Appl. No.: 17/408,035

(22) Filed: Aug. 20, 2021

(65) Prior Publication Data

US 2021/0378905 A1     Dec. 9, 2021

Related U.S. Application Data

(63) Continuation of application No. 17/051,163, filed as application No. PCT/CA2019/050640 on May 13, 2019, now Pat. No. 11,135,122.

(Continued)

(51) Int. Cl.
  *A61H 3/00*          (2006.01)
  *B25J 9/00*          (2006.01)
  (Continued)

(52) U.S. Cl.
  CPC .............. *A61H 3/00* (2013.01); *B25J 9/0006* (2013.01); *B25J 9/104* (2013.01); *B25J 9/1628* (2013.01);
  (Continued)

(58) Field of Classification Search
  CPC ................ A61H 3/00; A61H 2003/007; A61H 2201/5061; A61H 2201/5064;
  (Continued)

(56) References Cited

U.S. PATENT DOCUMENTS 7,862,527 B2     1/2011  Gramza et al.
8,070,700 B2    12/2011  Kazerooni et al.
  (Continued)

FOREIGN PATENT DOCUMENTS

CN         103330635 B       11/2014
CN         106956243 A   *   7/2017   ........... A61H 1/0218
  (Continued)

OTHER PUBLICATIONS

International Search Report in International Application No. PCT/CA2019/050640 issued Jul. 24, 2019.
  (Continued)

*Primary Examiner* — Tu A Vo
*Assistant Examiner* — Kelsey E Baller

(57)          ABSTRACT

A self-supported device for guiding motions of a target joint of a target body comprises a motion generator, a motion transfer system, a target body interfacing system, a load bearing system and a controller. The load bearing system comprises a plate connected to the motion transfer system and a network of joints and links to constrain the plate to rotate in three dimensions about a center of rotation of the load bearing system. A position of the center of rotation of the load bearing system is adjustable by adjusting a connection point between the links. The plate of the load bearing system is connected to an adjustable target body interfacing system that is mounted to the target body. The center of rotation of the load bearing system coincides with a center of rotation of the target joint of the target body.

30 Claims, 18 Drawing Sheets

Related U.S. Application Data

(60) Provisional application No. 62/670,858, filed on May 14, 2018.

(51) Int. Cl.
  B25J 9/10 (2006.01)
  B25J 9/16 (2006.01)

(52) U.S. Cl.
  CPC .. *A61H 2003/007* (2013.01); *A61H 2201/149* (2013.01); *A61H 2201/5061* (2013.01); *A61H 2201/5064* (2013.01)

(58) Field of Classification Search
  CPC ...... A61H 2201/1215; A61H 2201/123; A61H 1/00; A61H 1/024; A61H 1/0244; A61H 1/0266; A61H 1/0237; A61H 1/163; A61H 1/1642; A61H 1/165; A61H 1/5007; A61H 1/5069; A61H 2230/105; A61H 2230/605; B25J 9/0006; B25J 9/104; B25J 9/1628
  See application file for complete search history.

(56) References Cited

U.S. PATENT DOCUMENTS

| | | | | |
|---|---|---|---|---|
| 2010/0036302 | A1 * | 2/2010 | Shimada | A61H 3/00 602/23 |
| 2011/0152732 | A1 * | 6/2011 | Jang | A61H 3/00 135/66 |
| 2012/0010749 | A1 | 1/2012 | Van Der Merwe et al. | |
| 2012/0101415 | A1 * | 4/2012 | Goffer | A61H 1/0244 601/35 |
| 2013/0231595 | A1 * | 9/2013 | Zoss | A61H 3/00 601/34 |
| 2014/0005577 | A1 | 1/2014 | Goffer | |
| 2015/0025423 | A1 * | 1/2015 | Caires | A61H 3/00 601/35 |
| 2016/0016309 | A1 | 1/2016 | Swift et al. | |
| 2017/0071814 | A1 * | 3/2017 | Endo | A61H 3/00 |
| 2018/0325766 | A1 | 11/2018 | Arzanpour et al. | |

FOREIGN PATENT DOCUMENTS

| | | | | |
|---|---|---|---|---|
| CN | 109223449 | A | 1/2019 | |
| WO | 2012042471 | A1 | 4/2012 | |
| WO | WO-2017120680 | A1 * | 7/2017 | A61B 5/4571 |

OTHER PUBLICATIONS

Written opinion on Patentability of International Application No. PCT/CA2019/050640 issued Jul. 24, 2019.

* cited by examiner

SELF-SUPPORTED DEVICE FOR GUIDING MOTIONS OF A PASSIVE TARGET SYSTEM

CROSS REFERENCE TO RELATED APPLICATIONS

This application is a continuing application of U.S. application Ser. No. 17/051,163 filed Oct. 27, 2020, which is U.S. National Stage Application of International application No. PCT/CA2019/050640 filed May 13, 2019, which claims priority from U.S. Patent Application No. 62/670,858 filed on May 13, 2018. The entirety of all the above-listed applications are incorporated herein by their reference.

FIELD OF INVENTION

This invention relates to a self-supported device for guiding motions of a load bearing system and a motion assistance system employing the self-supported motion guiding devices to assist motions of a target body.

BACKGROUND OF INVENTION

Unless otherwise indicated herein, the materials described in this section are not prior art to the claims in this application and are not admitted to be prior art by inclusion in this section.

With respect to medical exoskeleton applications, an estimated 20,639,200 (7.1%) of non-institutionalized United States residents suffered from an ambulatory disability in 2013, while an approximated 2,512,800 (7.2%) of Canadians reported mobility disablements in 2012. These disabilities cost an estimated annual equivalent of $375 billion in family caregiver support, in addition to significant economic and social burdens to the patient and the healthcare system.

One emergent technology that aims to diminish this health problem and improve the quality of life for sufferers is the powered lower-body exoskeleton: wearable robotic systems that completely or partially support their user's weight and provide controlled guidance of leg movements, thereby allowing their user to stand and walk. This solution provides benefits over wheelchair use and other traditional means because it can also help reduce secondary complications of immobility such as pneumonia, blood clots, pressure sores, and lowered self-esteem. However, one major shortcoming of current exoskeleton technologies is a limited range of motion about the hip and ankle joints, which are both capable of three rotational degrees-of-freedom (DOFs) in the human body. In general, current technologies actively guide one degree-of-freedom (DOF) hip-centered movements with absent or only passive allowance for one or both of the other DOFs. This design scheme generally results in a serial joint structure within the exoskeleton device, which has an inherently lower pay load-to-weight ratio than a parallel structure counterpart. Therefore, this characteristic leads to bulkier than necessary devices. Furthermore, the instability that arises from kinematic restrictions on human joint capabilities often requires attendant use of walking crutches or a walker to maintain bodily balance while standing or moving. So, in order to safely operate the exoskeleton system, a user must coordinate motions with additional mobility aid using their upper body. The inconvenience and effort associated with this requirement causes fewer potential users from adopting the technology and altogether prevents other people from operating the devices who could otherwise benefit from the technology if not for this requirement.

SUMMARY OF THE INVENTION

In one aspect, a self-supported device for guiding motions of a target joint of a target body is provided. The device comprises a base structure, a motion generator, a motion transfer system, a load bearing system and a target body interfacing system. The load bearing system comprises a plate connected to the motion transfer and target body interfacing systems and a network of joints and links configured to constrain the plate to rotate in one, two or three dimensions about a center of rotation of the load bearing system. The position of the center of rotation of the load bearing system is adjustable by adjusting a connection point between the links. The plate of the load bearing system is connected to an adjustable target body interfacing system that is configured to be mounted to the target body such that the target body rotates with the load bearing system. The self-supported device further comprises at least one actuator and at least one driver in communication with the at least one actuator. A controller that comprises an input unit, an output unit and a processing unit sends output signals to command the at least one driver of the at least one actuator. The motion transfer system is connected to the motion generator at one end and to the load bearing system at an opposite end and is configured to convert the motions actuated by the at least one actuator to corresponding rotational motion at the load bearing system. The center of rotation of the load bearing system approximately coincides with a center of rotation of the target joint of the target body.

In another aspect, a motion assistance system is provided. The system comprises a self-supported device for guiding motions of a target joint and at least one additional joint system connected in series to the device for guiding motions to actuate at least one degree-of-freedom of the additional target joint. The at least one additional joint system is connected to the base structure or the plate of the load bearing system of the self-supported device such that a position of a connection between the plate and the additional joint system is adjustable. The motion assistance system further comprises at least one actuator to actuate at least one DOF and at least one driver in communication with the at least one actuator. A controller comprising an input unit, an output unit and a processing unit sends output signals to command the at least one driver of the at least one actuator.

In yet another aspect, the motion assistance system further comprises at least one additional self-supported device to allow motions of at least one additional target joint which comprises at least one additional actuator for actuating an additional at least one DOF. A controller is in communication with the at least one additional self-supported device and/or systems to coordinate their movements.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

This invention discloses a self-supported device for guiding motions of a target joint that can provide positioning in regard to the up to three-dimensional orientation of a ball-and-socket joint or quasi ball-and-socket joint without causing undue stresses to a corresponding target body. The device is self-supported even when the target body is not attached to the rest of the system. Examples of a device for guiding motions of a 3-DOF target joint are described in co-pending international patent application with publication number WO17120680, which is incorporated by reference herein in its entirety. The prior patent application discloses examples of a motion guiding device with a motion generator and a motion transfer and target interfacing system that transfers the motions generated by the motion generator to a target joint so that the target joint moves with a 3-DOF motion about its own center of rotation. The motion guiding device disclosed in the prior application requires attachment to a target body (e.g. a user's leg or arm) in order to remain stable. For example, if the user is not wearing the device, the device will collapse/fall over. In addition, any loads that the prior art device is carrying, such as, for example, the weight of the actuators above the actuated target joint, could partially be transferred through the part of the user carrying the device (e.g. a leg of the user), potentially making the user's joint bear unwanted loads. The device of the present invention can be used in an exoskeleton system to create a virtual spherical joint at (approximately) the center of rotation of a biological human joint, allowing that joint to be positioned while also allowing the device to bear its own load without making use of the user's own physical structure. The device of the present invention can be placed in series with additional active joints so that more complex systems (i.e. for use in tracking/augmenting/actuating) pertaining to an entire limb (i.e. a leg or arm or any other limb) or multiple limbs can be achieved. It should be noted that while all of the embodiments mentioned above pertain to 3-DOF joints, an individual skilled in the art could see that this invention could apply to systems with fewer degrees-of-freedom (i.e. by replacing certain joints with rigid connections) without departing from the scope of the invention.

Figure 1:
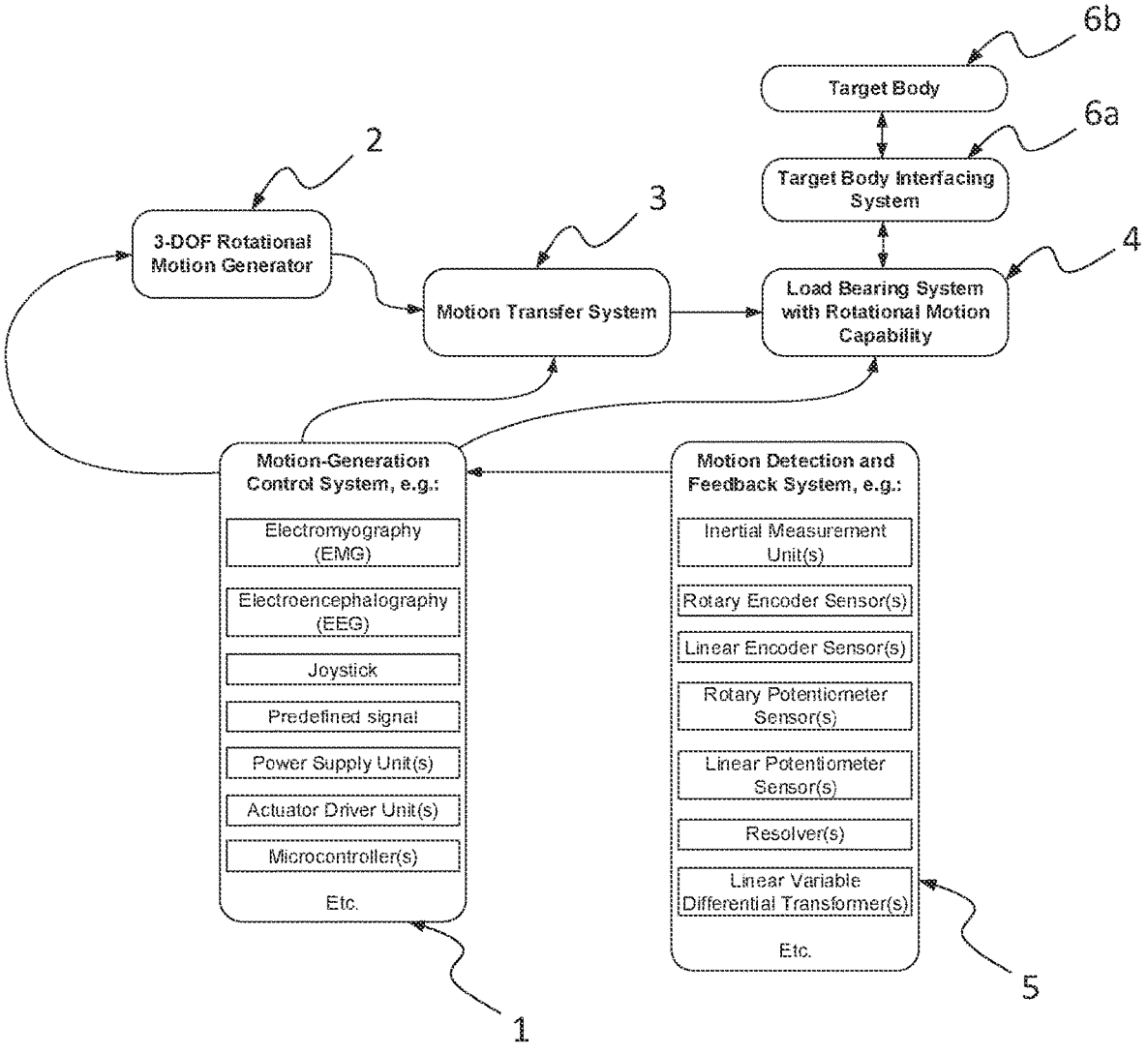
FIG. 1 is a flowchart of an example of a self-supported device for guiding motions of a load bearing system showing its subsystems and their interactions.

FIG. 1 illustrates a self-supported device 1000 for guiding motions of a target system that comprises a 3-DOF motion generator 2, a motion transfer system 3, a target body interfacing system 6a and a load bearing system 4. The motion transfer system 3 is configured to provide decoupled or combined 3-DOF rotational motion or inaction to the load bearing system 4. The load bearing system 4 may be any structure containing a 3-DOF rotational joint (e.g. a passive ball-and-socket joint), or a quasi-3-DOF rotational joint (e.g. a hip joint), or any other active or load bearing joint. The active target joint is defined as any target joint that has an ability to perform a 3-DOF rotational movement on its own without assistance of an external motion assistance device. For example, a human hip joint is an active joint since it can move on its own, however, in case when a person is incapable of producing motion (e.g. they are paralyzed) and the hip joint (or any other human joint) is only moved using a motion assistance device, then such a human joint can be considered to be a load bearing joint. So, in general, any joint capable of producing its own movement is considered active while a joint that is moved using some structure (e.g. actuators) is considered passive. In one implementation, the load bearing system 4 can be a system of structures where the end point behaves as if it contains any of these aforementioned joints. This load bearing system 4 can include a connection to a target body interfacing system 6a for subsequent attachment to a target body 6b (e.g. a human limb), which can also comprise any of the aforementioned joints. The target body 6b can be a load bearing body, such as for example a limb of a disabled person who cannot move the limb on their own (i.e. without using a motion assistance system such as an exoskeleton) or can be an active or a partially-active target body. In one implementation, the target body 6b can include a multibody system. The target body 6b can rotate about a center of rotation that can be aligned with approximately the center of rotation of the load bearing system 4. If the position of the center of rotation of the load bearing system 4 and the target body 6b are not exactly coincident, the connection between them can be made to be compliant/flexible/elastic so that the rotational motion of either load bearing system 4 or the target body 6b is not inhibited due to such connection being overly constrained. While the various devices/systems are generally described as being with three degrees-of-freedom motions, a person skilled in the art would understand that the devices/systems can have (be reduced to) certain 2-DOF or 1-DOF applications by reducing actuation in either the motion generator 2 and/or motion transfer system 3 and/or the load bearing system 4 with the option of removing appropriate passive joints (i.e. by creating rigid connections in their place) in the load bearing system 4 that correspond to the reduction in the degrees-of-freedom, without departing from the scope of the invention.

The motion generator 2 can provide actuation of the load bearing system 4 and any other attached body. The load bearing system 4 can support any structural loads that may arise if the device 1000 must carry/bear/transfer any weight (or any other kind of load) from one end of the device to the other. This can allow the target body 6b to be oriented without the threat of it being subjected to significant structural stresses at the joint due certain loads applied to the device 1000. The motion generator 2 conveys mechanical action to the load bearing system 4 via the motion transfer system 3, which physically supports the load bearing system 4 in some extent and converts action from the motion generator 2 to the desired movements of the load bearing system 4 and the target body 6b. In other embodiments, actuators can be included in the motion transfer system 3 and/or the load bearing system 4, in which case these components may also contribute to the creation of motion at the load bearing system 4 and the target body 6b. The target body 6b can be connected to the load bearing system 4 via a target body interfacing system 6a which may be rigid or compliant and transfers motion from the load bearing system 4 to the target body 6b. The device 1000 further comprises a control system 1 and a motion detection and feedback system 5. The control system 1 can comprise one or more input/output units and a processing unit. The input unit can comprise for example a joystick/keyboard, a touch screen, a voice recognition unit or any other user interface to input any command/instructions/parameters while an output unit can comprise an actuator driver unit to send trigger signals to, for example, the motion generator 2. The control system 1 can further comprise one or more microcontrollers, a power supply unit, a predefined signal processing unit for signal conditioning or signal filtering (e.g. filtering or calibrating signals obtained as an input), etc. For example, in one implementation, the control system 1 can receive signals from an Electromyograph (EMG) and/or Electroencephalograph (EEG) as an input. The EMG is a device that is used to detect the electrical activity of the muscles and EEG is used to detect the electrical activity of the brain. The signals obtained from the EMG and/or EEG are processed by the processing unit of the control system 1 to determine the desired motion of the load bearing system 4 and then trigger signals are sent to the motion generator 2 to generate such motion. The EMG and EEG can be, for example, part of the motion detection and feedback system 5. The motion detection and feedback system 5 can further comprise at least one of an inertial measurement unit, a rotary encoder sensor, a linear encoder sensor, a rotary potentiometer sensor, a linear potentiometer sensor, a resolver, a linear variable differential transformer, to detect a position and an orientation of the load bearing system 4, the target body 6b and/or a position and an orientation of each of the involved actuators. The motion detection and feedback system 5 can further comprise force/torque sensors to measure loads that are within the system or are applied externally and feed such signals as an input to the control system 1. The motion detection and feedback system 5 can also comprise a machine vision device, e.g., a camera, to provide images of the external environment and can feed such images as an input to the control system. For the purposes of this application, the phases "motion generator 2", "motion transfer system 3", "load bearing system 4", "target body interfacing system 6a" or any similar phrases can describe both a type of system or the specific system in a particular embodiment under discussion depending on the usage.

Figure 2:
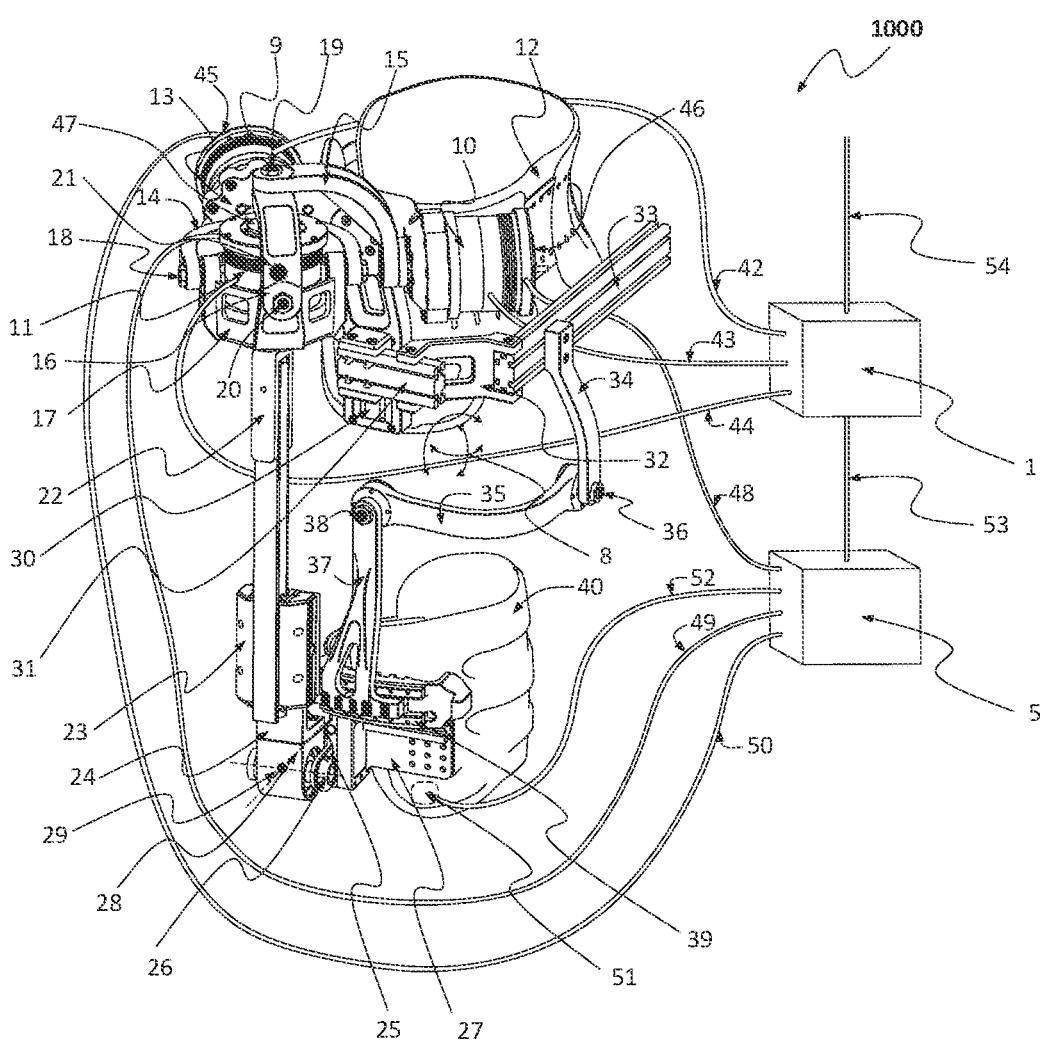
FIG. 2 is a perspective view of an example of a self-supported device for guiding motions of a passive 3-DOF target joint used as a hip joint exoskeleton module showing its components and subcomponents connections.

FIG. 2 illustrates the device 1000 for guiding motions of a target joint, such as a three degree-of-freedom (DOF) joint system approximately centered at point 8. For example, the device 1000 can be used as a hip joint exoskeleton module. An ergonomic and adjustable trunk orthotic 12 can be used to attach the device 1000 to the human body, for example adjacent to the hip joint, so that the device 1000 can be easily mounted for use or taken off when not in use. This is for illustrational purposes only and person skilled in the art would understand that the device 1000 can be used for guiding motions of any other human target joint (i.e. a knee, an ankle, a shoulder, a wrist, an elbow, a wrist, etc.) or any other target joint (i.e. a ball-and-socket spherical joint) without departing from the scope of the invention. Generally, rotary joints referred to in this figure and subsequent figures have one degree-of-freedom unless otherwise stated.

Attached to the trunk orthotic 12 is the 3-DOF rotational motion generator that can comprise rotary actuators 9 and 10. The rotary actuators 9 and 10 are rigidly supported by a base structure 13 of the device 1000. The actuator 9 connects to a link 14 which then connects to an effector 17 via a rotary joint 18. The actuator 10 connects to a link 15 which then connects to a link 16 via a rotary joint 19. The link 16, in turn, connects to the effector 17 via a rotary joint 20. An actuator 11 is then mounted on the effector 17. The axes of rotation of the actuators 9-11 and the joints 18-20 all intersect at a point 21 and the resulting mechanism allows for a three degrees-of-freedom rotation (at the output of the actuator 11) about the point 21. The actuator 11 also connects to a rail 22 which can move linearly with respect to a cassette 23, constituting a 1-DOF linear-motion joint (i.e. a prismatic joint). The cassette 23 is connected to a linkage 24 which is connected to a link 25 via a rotary joint 26. The link 25, connects to a plate 27 via a rotary joint 28. The axes of rotation of the rotary joints 26 and 28 intersect at a point 29 and allows two degrees-of-freedom rotation about the point 29 between the cassette 23 and the plate 27. For the purposes of this application, the term "plate" denotes a body or link and does not imply any particular geometry for this rigid body or link.

A link 30 is rigidly attached to the base 13 and a link 31 is rigidly connected to the link 30. The links 30 and 31 can be easily detached and a connection point between them altered by reconnecting them at a different position. For example, the connection between links 30 and 31 can be accomplished using removeable bolts or any other easily removeable fastener (connecting element). A link 32 is rigidly connected to the link 31, such that a connection point between links 31 and 32 can also be adjusted (i.e. similar to the connection point between links 30 and 31). A link 32 is attached to a link 33 which is, in turn, attached to a link 34. The connection point between links 33 and 34 is also adjustable by a similar mechanism. Due to the adjustability between links 30 and 31, 31 and 32, as well as 33 and 34, the point of the connection of links 33 and 34 can be adjusted (within a particular range) in three dimensions with respect to the base 13. The link 34 is connected to a link 35 via a rotary joint 36. The link 35 is then connected to a link 37 via a rotary joint 38. The link 37 is connected to the plate 27 via a joint 39 whose center of rotation passes through a point 8. The joint 39 can be a curvilinear joint that represents a portion of a circle whose center axis passes through a point 8 and performs the function of a rotary joint that is placed along and aligned to that center axis, so that joint 39 does not interfere with a user body (e.g. target body 6b) when the device 1000 is worn by the user. The axes of rotation of the joints 36, 38 and 39 all intersect at point 8, such that the structure consisting of the components 30-39 constrain the plate 27 to rotate (in three dimensions) about the point 8. The plate 27 is connected to an ergonomic and adjustable upper leg orthotic structure 40 that can allow an interface with a user's upper leg 41 (see FIG. 3).

With respect to this embodiment of the device 1000, the components 22-26, 28 are part of the motion transfer system 3, the components 9-11, 14-21 are part of the motion generator 2, the components 27, 30-39 are part of the load bearing system 4 and the components 40 are part of the target body interfacing system 6a. The upper human leg, if the device were worn, would be part of the target body 6b. A person skilled in the art would understand that any of the passive rotary or linear joints of the motion generator 2 and/or the motion transfer system 3 and/or the load bearing system 4 can be replaced with active rotary/linear joints, such as for example rotary/linear actuators, without departing from the scope of the invention.

The structures 27, 30-39 of the load bearing system 4 constrains the rotation of the plate 27 (and also the orthotic 40 of the target body interfacing system 6a) to a rotation about the point 8, the position of which can be adjusted (i.e. via the alterable connections between the links 30 and 31, 31 and 32, as well as 33 and 34) to coincide with the quasi-spherical joint 7 (see FIG. 3) of the target body 6b. In the illustrated example, the structures 27, 30-39 of the load bearing system 4 are passive, however persons skilled in the art would understand that such structures can be active as described herein above. The structure of the device 1000 (i.e. the structure of the motion generator 2, the motion transfer system 3, the target body interfacing system 6a and the load bearing system 4) is stable and supported even when the target body interfacing system 6a is not anchored to an additional structure such as a human body (the target body 6b). Using the load bearing system 4, additional loads (that may be unrelated to the movement of the target body 6b) can be transferred though the load bearing system 4 without necessarily transferring them through the target body 6b (i.e. the upper human leg) while still allowing the device 1000 to rotate as desired. The structure of the load bearing system 4 is designed such that it constrains the plate 27 (and anything attached to plate 27) to rotation about the point 8 without needing to place any mechanical components at the point 8 itself (which can be located inside the body of the user wearing the device 1000 and, therefore, be inaccessible). In the case where the points 7 and 8 cannot be precisely aligned, the connection between the upper leg 41 and the orthotic structure 40 (the target body interfacing system 6a) can be compliant/flexible/elastic, so that the rotational motion of either device 1000 or the target body 6b in not inhibited. Persons skilled in the art could understand that any other structure that provides a virtual point of rotation about 8 without interfering with a user's body could also be used as the load bearing system 4 without departing from the scope of the invention, and that for different applications, these spatial requirements (and the specific form of the structure) may vary. In the illustrated example of FIG. 2, the device 1000 is applied to the human hip joint, a person skilled in the art would understand that the device 1000 can be applied to any other human joints (i.e. ankle, knee, shoulder, elbow, wrist etc.) without departing or going beyond the scope of the invention.

Generally, while, for illustration purposes, three actuators are shown as part of the motion generator 2, for supporting the 3-DOF motion required by the virtual target joint 8 (which can be at least partially aligned with the target body joint 7), the motion generator 2, the motion transfer system 3, and the load bearing system 4 can collectively include at least three actuators to provide 3-DOF motion. The number of the actuators can be reduced via replacement by passive rotary or prismatic joints according to the number of DOFs of the load bearing system 4 that do not require actuation. For example, in case where the load bearing system has one DOF motion the motion generator 2, the motion transfer system 3, and the load bearing system 4 can collectively include one actuator. Any and all actuators of the motion generator 2, the motion transfer system 3, and/or load bearing system 4 can be selected from an electric motor, a pneumatic motor, a hydraulic motor or any other motor or combination thereof with any combination (or absence) of gearhead. The purpose of the motion transfer system 3 is to connect and transfer motions between the motion generator 2 and the load bearing system 4 (and, consequently, any connected target body 6b) or, in some implementations, to contribute to the motion guiding device's actuation if one or more actuators are included in the motion transfer system 3.

As shown in FIG. 2, the rotary actuators 9-11 receive control signals from the control system 1 via connections 42-44 respectively. Furthermore, sensors 45-47 are respectively attached to the rotary actuators 9-11 to provide information to the motion detection and feedback system 5 via connections 48-50. Additionally, a sensor package 51 provides data to the motion detection and feedback system 5 via a connection 52. The motion detection and feedback system 5 provides information to the control system 1 via a connection 53. When applicable, the control system 1 receives and/or sends data to a similar controller of another device 1000 for coordinating the movements (e.g. two exoskeleton units could coordinate gait movements) via a connection 54. Connections may be wired or wireless depending on their function.

The control system 1 is in communication with the motion generator 2 and can trigger the motion generator 2 to achieve a desired action or inaction of the load bearing system 4 (and potentially the target body 6b) and can include a software execution commanding to trigger the actuators 9-11 via an appropriate driver subsystem. Additionally, the control system 1 can be programmed to receive control signals from the electromyograph, electroencephalograph, or the instructions can be inputted directly via joystick, keyboard or other input unit, or the controller's software may be executed based on a predefined routine pre-programmed therein. Furthermore, the control system 1 can receive input information from the motion detection and feedback system 5 that interfaces with and monitors the load bearing system 4 (and/or the target body 6b) and the actuators 9-11. The motion detection and feedback system 5 may acquire information on the target joint's state using one or more inertial measurement units, rotary encoder sensors, linear encoder sensors, rotary potentiometer sensors, linear potentiometer sensors, resolvers, linear variable differential transformers, foot force/torque sensors, vision devices, etc., or a combination of the above. In one implementation, sensors of the motion detection and feedback system 5 can interface with and monitor the position and/or orientation of the actuators 9-11. In one implementation, the sensors of the motion detection and feedback system 5 may detect the position and/or the orientation of the load bearing system 4 or the target body 6b, in applications such as in identifying user's intention and/or to electronically store sensor readings for later transfer to a computer (controller) to collect error information and/or motion capture data. For example, the motion detection and feedback system 5 can measure a position and/or orientation of the links and joints network and/or the plurality of actuators, as well as the forces/torques acting between the links and joints network and/or actuators and the forces/torques acting between the self-supported device 1000 device and its environment.

Figure 3:
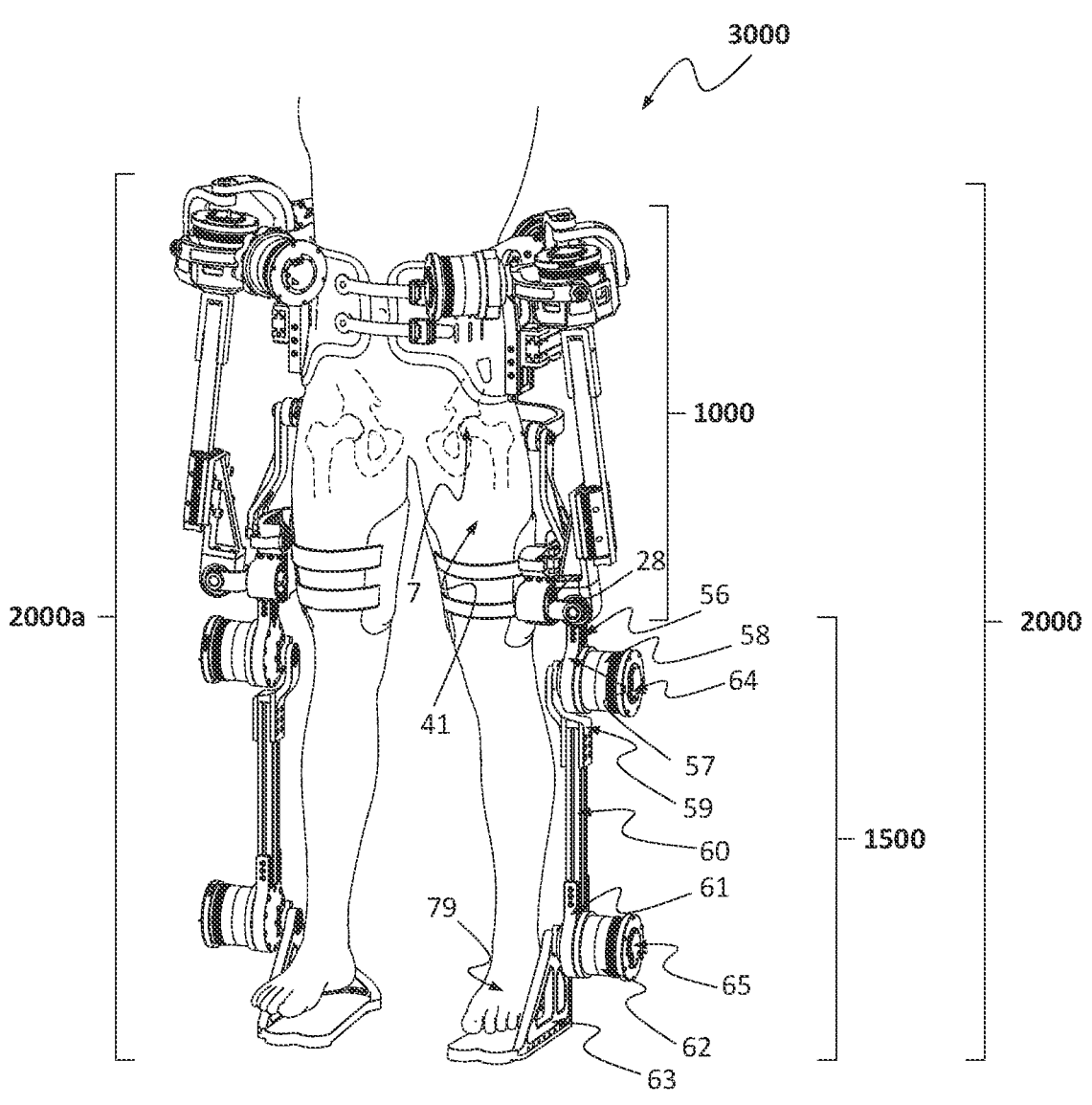
FIG. 3 is a front view of an example of a motion assistance system used as an exoskeleton system showing two self-supported devices for guiding five DOFs of motion of a target body mounted on each side of a human user.
Figure 4:
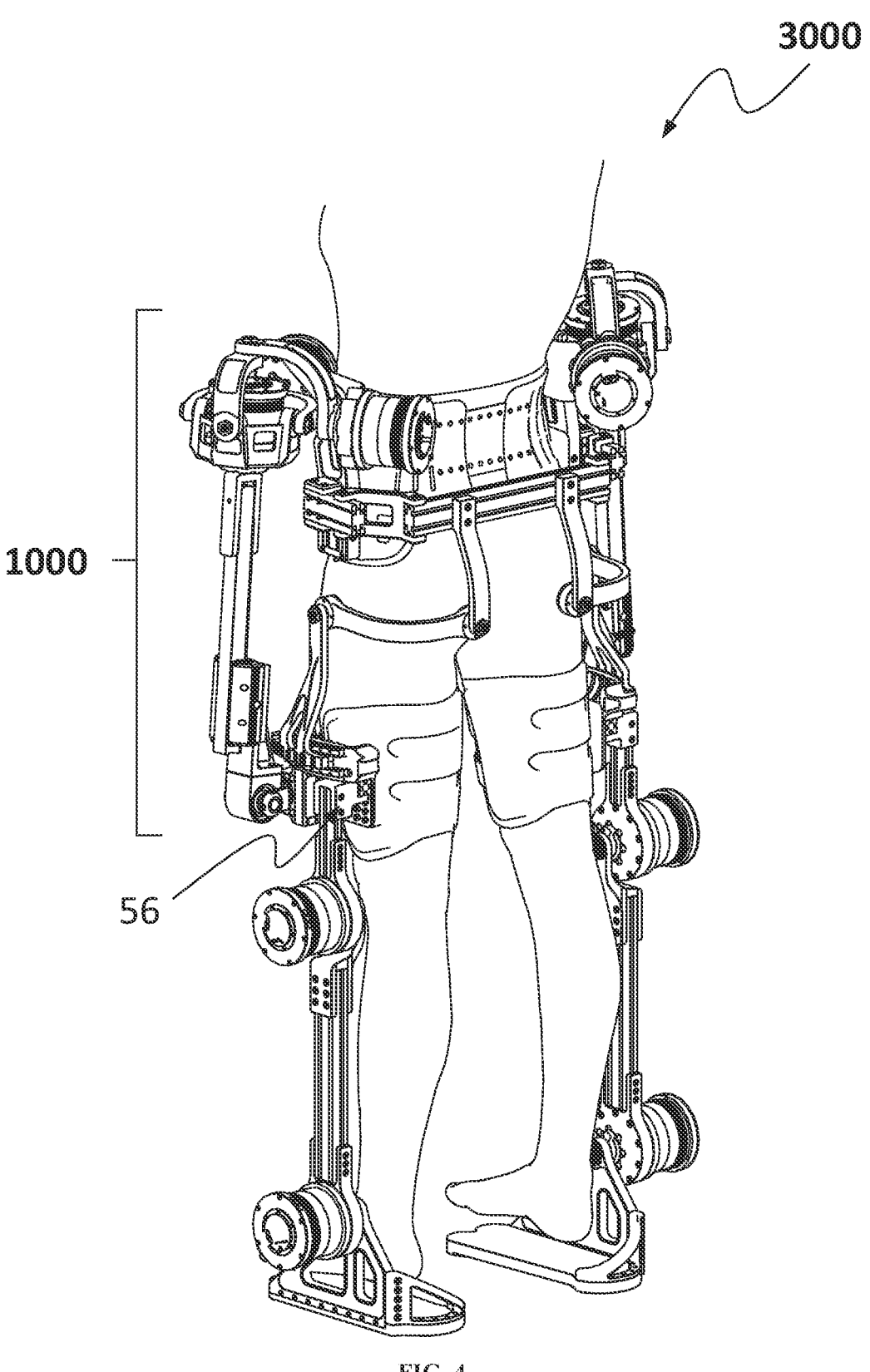
FIG. 4 is a back view of the motion assistance system shown in FIG. 3.

FIGS. 3 and 4 show a motion assistance exoskeleton system 3000 mounted to a user (as a target body 6b). The motion assistance system 3000 can comprise two motion guiding devices 2000, 2000a that are mounted on each side of the user (e.g. one per each leg of the user). Each of the devices 2000 and 2000a comprises a motion guiding device 1000 that is a hip joint exoskeleton module as the one described above with respect to FIG. 2 and additional components 1500. The motion guiding device 1000 is a subset of the motion guiding device 2000/2000a which is, in turn, a subset of motion assistance system 3000. The additional components 1500 can be a knee joint exoskeleton module and an ankle joint exoskeleton module. The additional components 1500 extend the functionality with two additional actuated degrees-of-freedom so that the knee and ankle joints can also be positioned. As such, the devices 2000 and 2000a together compose a lower body exoskeleton. The additional components 1500 can comprise a link 56 that is rigidly connected to the plate 27 of the device 1000. A position of the attachment between the link 56 and the plate 27 can be changed in a similar fashion as the adjustability of the connections between the links 30 and 31, 31 and 32, as well as 33 and 34 described herein above with respect to FIG. 2. The link 56 is rigidly connected to a link 57, such that a position of a connection can be changed. The link 57 is attached to an actuator 58. The output of the actuator 58 is connected to a link 59. The link 59 is rigidly connected to a link 60, such that the position of the connection between links 59 and 60 can be changed. The link 60 is rigidly connected to a link 61, such that the position of the connection can be changed. The link 61 is connected to an actuator 62. The output of actuator 62 is connected to an effector 63. Through the adjustable nature of the connections between the plate 27 and the link 56, links 56 and 57, links 59 and 60 as well as links 60 and 61, the motion guiding device 2000 can be adapted for use with various leg lengths and different positions of the knee/ankle axes of rotations. The motion detection and feedback system 5 of the motion guiding devices 2000, 2000a can further comprise sensors 64 and 65 which can be used to monitor the actuators 58 and 62. Also, the control system 1 of the devices 2000, 2000a can further comprise additional connections to the actuators 58, 62 and the sensors 64, 65, so that they can be positioned along with the actuators 9-11. The motion detection and feedback system 5 may also have connections to additional sensors installed on any of the components 1500 which may be used to monitor motion execution or interactions with the environment which could involve inertial measurement units, strain gauges, load cells, gyroscopes, vision units or any other type of sensor. The motion guiding devices 2000, 2000a comprise two additional rotary joints in series with the device 1000 to actuate an additional two degrees-of-freedom for the knee and the ankle and create a useable full leg exoskeleton, however, a person skilled in the art would understand that other more complex joints could also be used in series with the device 1000 to accomplish this. For example, a similar device 1000 can be mounted at the ankle and/or the knee without departing from the scope of the invention. Persons skilled in the art would understand that the motion assistance system 3000 could be applied to other human limbs (or any other system composed of series of rotary or quasi-rotary joints) without departing from the scope of the invention. The passive components 27, 30-39 of the load bearing system 4 located at the hip joint allow certain externally applied loads, such as the weight of the device (or any similar load applied by the environment), to transfer through the load bearing system 4 to another point (e.g. the ground) without causing undue structural stresses on the user due to these kinds of loads. For the purposes of this application, and other relevant descriptions, the points 7 and 8 are considered to be aligned unless otherwise stated, although alignment may only be approximate in reality. For example, the weight of the actuators 9-11 while located above the hip joint 7 would not cause additional forces to be transmitted through the upper leg of the user 55 since the motion guiding device 2000, 2000a is a self-supporting structure and can transmit forces to the ground through its own structure using the passive components 27, 30-39 of the load bearing system 4. The control system 1 of the device 2000 is in communication with a controller of the other device 2000a to synchronize and coordinate their movements. The two controllers 1 can identify a user's intention based on the information obtained from the respective sensors of the corresponding motion detection and feedback systems 5 and can then send the appropriate triggering signal to the drivers of the actuators of the respective motion generators 2 to generate specific motions. In one implementation, the control system 1 of the first motion guiding device 2000 can be in communication with the motion generator 2 and the motion detection and feedback system 5 of the second device 2000a such that a single control system 1 can control the movement of the both motion guiding devices 2000, 2000a.

Figure 5:
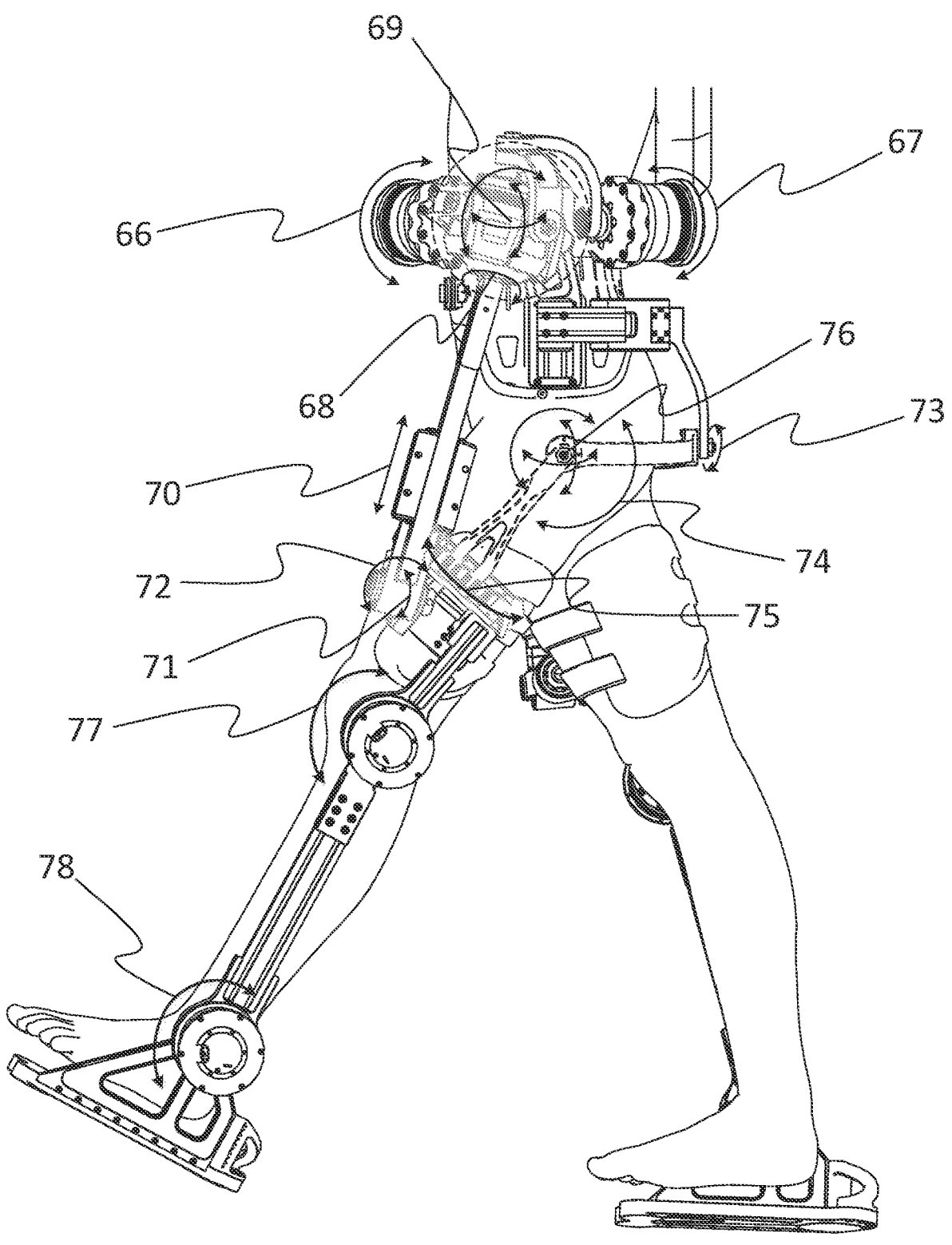
FIG. 5 is a side view of an example of a motion assistance system of FIG. 3 used as an exoskeleton system mounted to a human user.

FIG. 5 illustrates a motion assistance exoskeleton system 3000 used as an aid device to help the user during walking operation. As depicted in FIG. 5, the respective coordinated actions 66-68 of the rotary actuators 9-11 generate a 3-DOF rotary motion 69 of the output of the actuator 11 about its center of rotation at point 21 that does not coincide with the center of rotation of the hip joint 7 or the center of rotation of the load bearing system 4 (e.g. point 8). The rail 22 also experiences a 3-DOF rotary motion about that point because it is attached to the output of the actuator 11. Motion of the rail 22 produces synchronized responses 70 of the passive prismatic joint (consisting of the rail 22 which can slide along one axis relative to the cassette 23) as well as responses 71 and 72 of the passive rotary joints 26 and 28 respectively. This results in synchronized responses 73, 74 and 75 of the passive rotary joints 36, 38 and 39 respectively which constrains the movement of the plate 27 and the orthotic 40 to rotate about the point 8, which is adjustable via the mechanisms described in FIG. 2. The net result of these actions is response 76 which is a 3-DOF rotation of the plate 27 and the orthotic 40 about point 8 as well as the rotation of the upper leg 41 about the point 7 provided that the points 7 and 8 are aligned. Additionally, the actuators 58 and 62 can create responses 77 and 78 at their respective locations providing a total of five DOFs at the effector 63 (i.e. three DOFs from the hip joint and two DOFs from the knee/ankle joints), which is attached to the foot 79, allowing movement of the entire leg.

Figure 6:
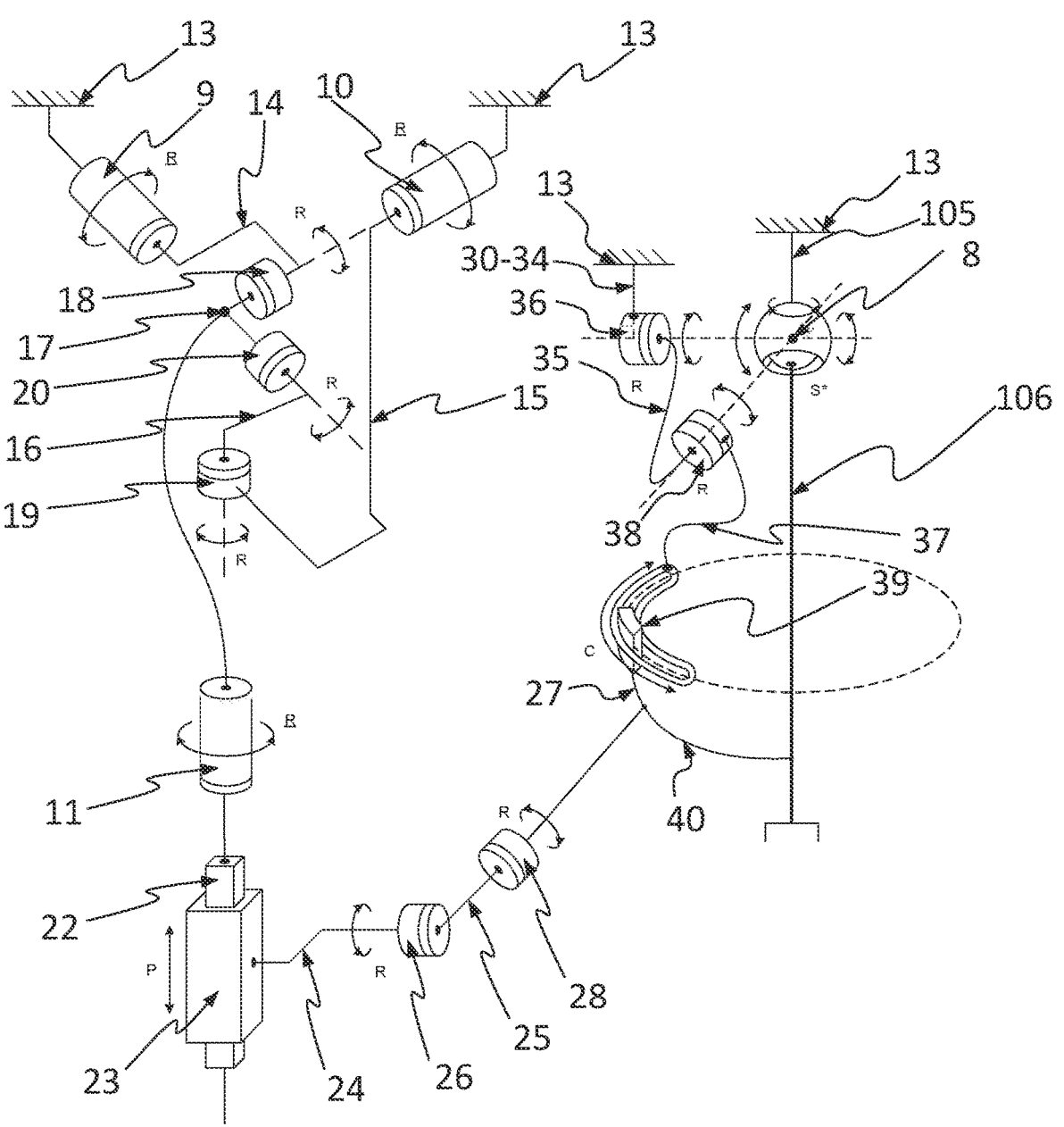
FIG. 6 is a mechanical schematic view of an example of a self-supported device for guiding motions showing joint and linkage components with joint motion capabilities where as labeled 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIG. 6 more clearly illustrates the correlation between actions of the actuators 9-11 of the motion generator 2 and corresponding motions and actions of the respective linkages and passive joints in regard to the load bearing system 4 and the target body 6b. The combination of the motions 66-68 of the actuators 9-11 results in a motion response 76 by the load bearing system 4 about point of rotation 8, which can be approximately aligned with the point of rotation of the user's hip joint 7 (of the target body 6b), in one or any combination of its 3-DOF rotation capabilities 76. The system of linkages 24 and 25, the passive rotary joints 26 and 28 and the prismatic joint comprised of the sliding component 22 and the cassette 23 interconnected as described herein above, in conjunction with the linkages 30-34, 35, 37 and the passive rotary joints 36, 38 and 39 also interconnected as described herein above, provide the 3-DOF motion of the plate 27 and the orthotic 40 with a center of rotation that coincides with the center of rotation 8 of the load bearing system 4 (and potentially the center of rotation 7 of the target body 6b), despite the fact that the center of rotation 21 of the output of the actuator 11 of the motion generator 2 does not coincide with the center of rotations 8 or 7 of the load bearing system 4 or the target body 6b, respectively. Thus, the motion generator 2 can be mounted away from the hip and the motion transfer system 4 will allow 3-DOF motion of the upper leg 41 about point 7 when the center of rotation 7 of the hip and the center of rotation 8 of the load bearing system 4 are aligned and the human leg 41 is correctly attached to the orthotic 40 (comprising the target body interfacing system 6a). In the case where the rotary joints 36, 38 and 39 cannot be precisely aligned with the virtual spherical joint 8 (point of rotation of the load bearing system 4), the attachment between the target body 6b and the load bearing system 4 (which comprises the target body interfacing system 6a) can be compliant/flexible/elastic so that a rotational motion is not inhibited The same principle can apply to subsequent figures and with other embodiments where relevant. The motions 66-68 and the user's hip joint response 76 are all facilitated by the collective DOFs of the passive (or in some implementations active) rotary and/or prismatic joints. A person skilled in the art would understand that, instead of providing all three potential degrees-of-freedom of actuation (usually employing at least three actuators) in the spherical motion generator 2 of the device 1000 as shown in previous figures which, in FIGS. 3-5, is a subset of the device 2000 which is itself a subset of the system 3000, actuation can be moved to various joints which are passive in the above mentioned embodiments shown in FIGS. 2-6, such as in the motion transfer system 3 or the load bearing system 4, to also provide up to 3 DOFs of motion, without departing from the scope of the invention. In the case that actuation is moved from one or more joints considered active in FIGS. 2-6, the actuator can be replaced with a passive joint or structure. In the event that all actuation is moved from the motion generator 2 to the motion transfer system 3 and/or load bearing system 4, the motion generator 2 would be passive (would not contain any actuators) and motion would actually be generated in the motion transfer system 3 and/or load bearing system 4 rather than the motion generator 2, however, for the sake of consistency, the naming of the various systems will remain the same. A person skilled in the art would understand that embodiments of this kind are also within the scope of this application. If the motion generator 2 is passive, it nonetheless undergoes motion with the other system components as it is connected to the motion transfer system 3 which is, in turn, connected to the load bearing system 4 which undergoes motion with the target body 6b. Also, the motion generator 2, regardless of whether it is passive or active, supports the motion transfer system 3 insofar as it provides the connection point for the motion transfer system 3 on one side.

Figure 7:
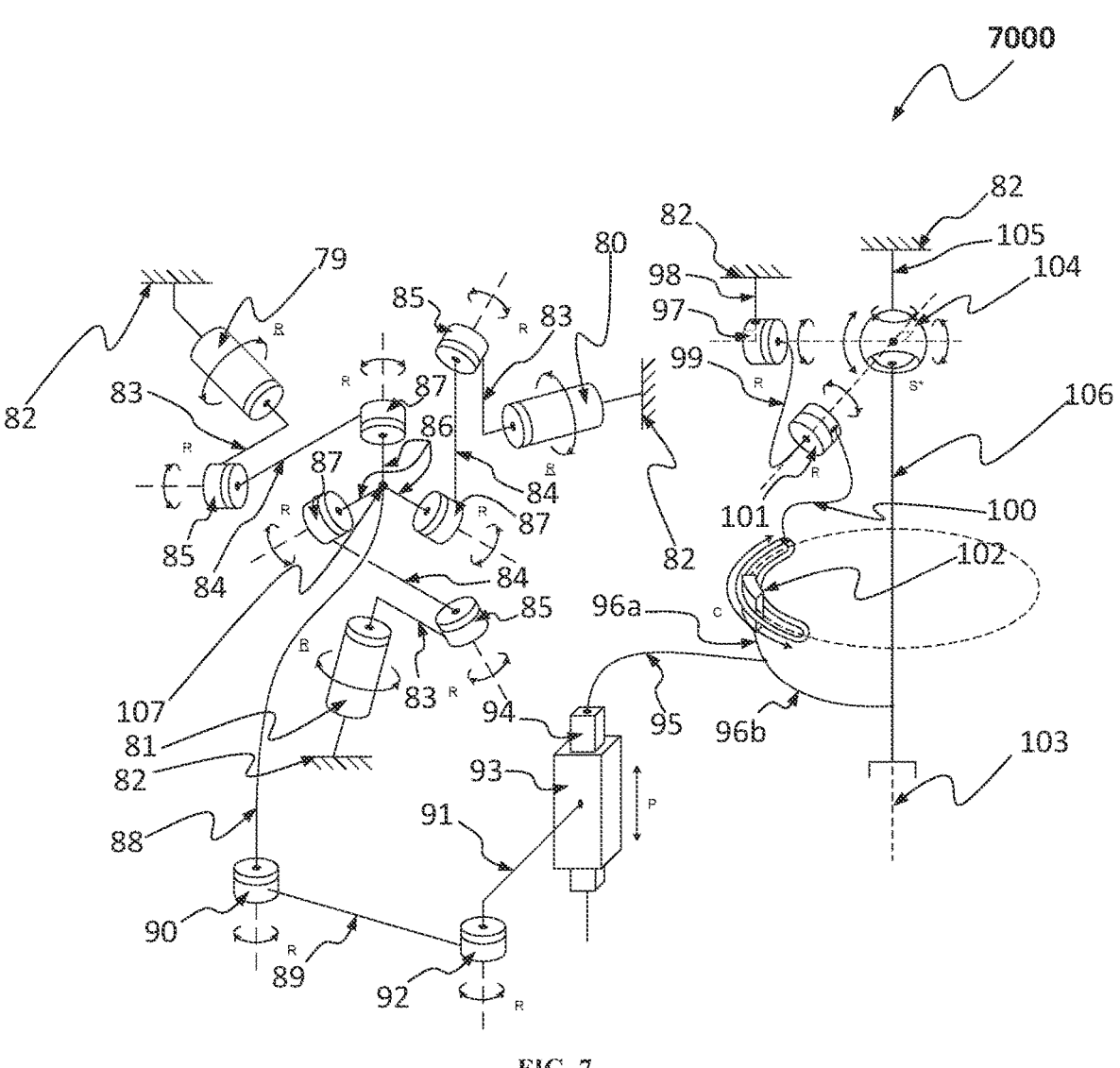
FIG. 7 is a mechanical schematic view of another example of a self-supported device for guiding motions showing joint and linkage components with joint motion capabilities where as labeled 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIG. 7 illustrates another embodiment of a device 7000 for guiding motions of 3-DOF load bearing joint systems while protecting the oriented body from certain external loads by allowing them to transfer through the device. In general, the illustrations (figures) presented in this application are not meant to depict (or restrict an embodiment to have) any special geometric relationships between joints (such as perpendicularity or parallelism) unless otherwise stated, although exceptions may occur. The motion guiding device 7000 comprises three rotary actuators 79-81 that are mounted to a base 82. The rotational output axes of these actuators 79-81 can be aligned coaxially with each other. The outputs of each of these actuators are attached to a set of proximal links 83. The links 83 connect to a set of distal links 84 by way of a set of three 1-DOF rotary joints 85. The links 84 connect to a moving plate 86 by way of a set of three rotary joints 87. The moving plate 86 is then rigidly connected to the link 88. The link 88 is connected to the link 89 by way of a rotary joint 90. The link 89 is connected to the link 91 by way of the rotary joint 92. The link 91 is rigidly connected to the cassette 93 which is interfaced with the rail 94 which can move linearly relative to the cassette 93 along one axis, forming a passive prismatic/linear joint. The rail 94 is rigidly connected to the link 95 which is, in turn, rigidly connected to the plate 96a. A rotary joint 97 is connected to the base 82 by way of a link 98. The rotary joint 97 is then connected to a link 99 that is connected to a link 100 via a rotary joint 101. The link 100 is connected to the plate 96a by way of a curvilinear joint 102, which functions as a rotary joint about the axis 103. A spherical joint 104 is positioned relative to the base 82 by way of an offset 105. The spherical joint 104 is then rigidly connected to the link 96b by the link 106. The interface 96b is then connected to the plate 96a. The rotary joints of sets 85, 87 and the actuators 79-81 have axes of rotation that intersect at the point 107, around which the plate 86 rotates. Also, the rotary joints 97, 101 and 102 have axes of rotation that intersect at the center of spherical joint 104. With respect to this embodiment the components 79-81, 83-87 are part of the motion generator 2, the components 88-95 are part of the motion transfer system 3, the components 96a-102 are part of the load bearing system 4 and the components 96b are part of the target body interfacing system 6a. The components 104, 105, 106 are part of the target body 6b which is to be rotated and which has a center of rotation that is coincident with the center of rotation of the load bearing system 4. The target body 6b can be, for example, the upper human leg attached to the pelvis via a quasi-spherical joint. In the case where the center of intersection of the rotary joints 97, 101 and 102 cannot be precisely aligned with the spherical joint 104, the attachment between the target body 6b and the load bearing system 4 (comprising the link 96b being the target body interfacing system 6a) can be compliant/flexible/elastic, so that the rotational motion is not inhibited (the same principle can apply to any embodiment where relevant). As a note, a person skilled in the art would understand that if the components 104, 105, 106 composing the target body 6b were removed, the remainder of the system would still be structurally complete. Similar to previous embodiments, this embodiment involves connections from the actuators 79-81 to the control system 1 and connections from the relevant sensors to the motion detection and feedback system 5. In regard to the configuration of the prismatic joint, the link 91 connects to the cassette 93, which forms a joint with the rail 94, which is then connected to the link 95. However, the components can be ordered such that the link 91 connects to the rail 94, which forms a joint with the cassette 93, which then connects to the link 95 (thus reversing the ordering of the cassette and rail). Under this scheme, the joint formed by both the rail 94 and cassette 93 retains its functionality of allowing linear motion. A person skilled in the art would understand that such a swapped configuration is within the scope of the application and, moreover, this principle regarding the ordering of the cassette and rail can apply to any other embodiment, and additional embodiments arising from the application of this principle are also within the scope of the application.

A person skilled in the art could understand that different motion generators 2 can be used with different motion transfer systems 3 and/or load bearing systems 4 in combinations that may not be exhaustively displayed in this application and that any and all such combinations are within the scope of the application. Additionally, in other implementations, the passive joints in the motion transfer system 3 and the load bearing system 4 can be replaced with active target joints, that is, the actuation can be moved to one or more of the joints that may be considered passive. Correspondingly, joints which are considered active in certain embodiments can be replaced with passive joints provided that the there are other active joints sufficient to provide the necessary DOFs of motion (this principle can apply to any embodiment). A person skilled in the art could understand that in any combination of motion generation system 2, motion transfer system 3 and load bearing system 4 there are many possible actuator placements (in regard to the selection of joints for actuation) that can yield motion guiding functionality and that any and all such combinations are also within the scope of this application. Additionally, while the embodiments described in this document generally describe systems for guiding three DOFs of motion, embodiments can be modified to instead actuate fewer degrees of freedom possibly involving replacing certain joints (generally in the load bearing system 4) with rigid connections and by modifying the number and location of actuators accordingly. This principle can apply to any embodiment mentioned in this application (whether it is explicitly shown or mentioned as being within the scope of the application) and a person skilled in the art would understand that any embodiments resulting from the application of this principle are also within the scope of this application. Certain of these statements regarding alternative embodiment configurations may be made in relation to particular embodiments for illustration purposes and this is not meant to limit the scope of the application. Also, the omission of any of these statements regarding alternative embodiment configurations in relation to a particular embodiment is not intended to necessarily indicate that any of these statements regarding alternative embodiment configurations do not apply.

In all of the illustrated examples of the devices for guiding motions of target joints (e.g. 1000, 2000 and 7000) or the motion assistance systems 3000, the actuators and/or their drivers are mechanically connected into such devices/systems, however one can understand that such actuators and/or drivers can be remote from such devices/systems (e.g. can be placed in a backpack carried by a user) and the motion of the actuators can be transferred to where it is needed by a pulley-cable system and the driver signals can be transferred by a wire or wirelessly. The actuators can be selected from an electric motor, a pneumatic motor, a hydraulic motor or any other motor or combination thereof.

Figure 8:
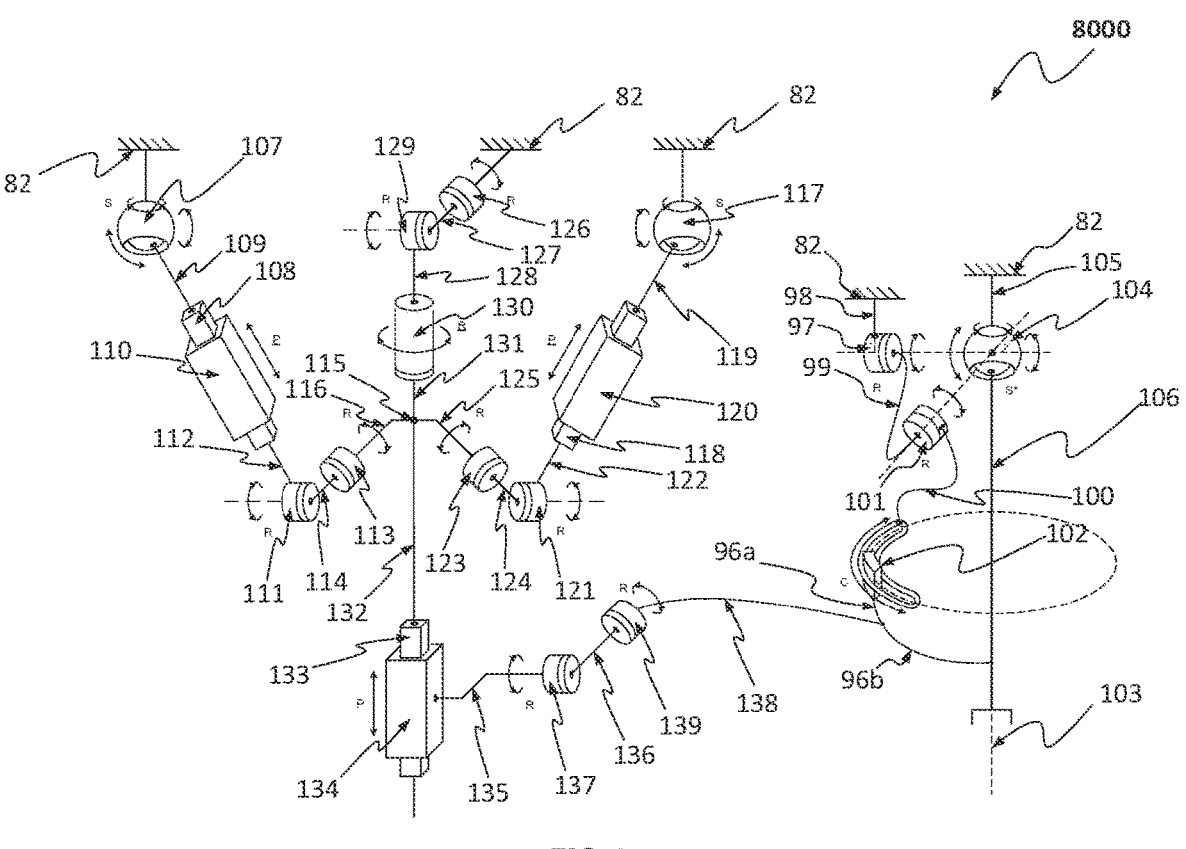
FIG. 8 is a mechanical schematic view of another example of a self-supported device for guiding motions showing joint and linkage components with joint motion capabilities where as labeled 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIG. 8 illustrates another embodiment of a device 8000 for guiding motions of 3-DOF joint systems while protecting the oriented body from certain external loads by allowing them to transfer through the device. The motion guiding device 8000 comprises a base 82 which is connected to a spherical joint 107 which is connected to a rail 108 via a link 109. The rail 108 comprises one side of a linear actuator 110. The output of the actuator 110 is connected to a rotary joint 111 via a link 112. The rotary joint 111 is connected to a rotary joint 113 via a link 114. The rotary joint 113 is, in turn, connected to a plate 115 via a link 116. There is another similar arm of the device which first consists of a spherical joint 117 connected to the base 82. This joint 117 is connected to a rail 118 via a link 119. The rail 118 comprises one side of a linear actuator 120. The output of the actuator 120 is connected to a rotary joint 121 via a link 122. The rotary joint 121 is connected to a rotary joint 123 via a link 124. The rotary joint 123 is, in turn, connected to the plate 115 via a link 125. Also, there is a 1-DOF rotary joint 126 connected to the base 82 which, in turn, connects to a link 127 that is connected to a link 128 by way of a rotary joint 129. Connected to the rotary joint 129 is a rotary actuator 130. The rotary joints 126 and 129 as well as the actuator 130 intersect at a common point. The output of the rotary actuator 130 connects to the plate 115 via a link 131. The plate 115 via a link 132 connects to a rail 133 which can move relative to a cassette 134 along one axis forming a passive prismatic joint. The cassette 134 is rigidly connected to a link 135 which is connected to a link 136 via a rotary joint 137. The link 136 is connected to a link 138 via a rotary joint 139. The link 138 also connects to a plate 96a. The components 96a, 97-102 compose the load bearing system 4, component 96b compose the target body interfacing system and components 104-106 compose the target body 6b, respectively, and are of a similar structure to device illustrated in FIG. 7. In this embodiment, the components 107-131 are part of the motion generator 2 and the components 132-138 are part of the motion transfer system 3. The primary difference of the device 8000 illustrated in FIG. 8 from the previously described motion guiding devices 1000, 2000, 7000 is in the structure of the motion generator 2. In the motion generator 2 shown in FIG. 8, the plate 115 can rotate (with three DOFs) around the intersection point of the rotary joints 126, 129 and the actuator 130. In the motion guiding device 8000, the actuators 110, 120, 130 allow for 3-DOF positioning of the load bearing system 4 and the target body 6b (via the target body interfacing system 6a). A person skilled in the art would understand that the motion guiding device 8000 depicted in FIG. 8 (and/or the motion guiding device 7000 of FIG. 7) can be used in a motion assistance system 3000, as shown in FIGS. 3 and 4, in place of the device 1000, or as a system/subsystem of other such motion assistance systems without compromising its positioning functionality or its ability to transmit load.

Figure 9:
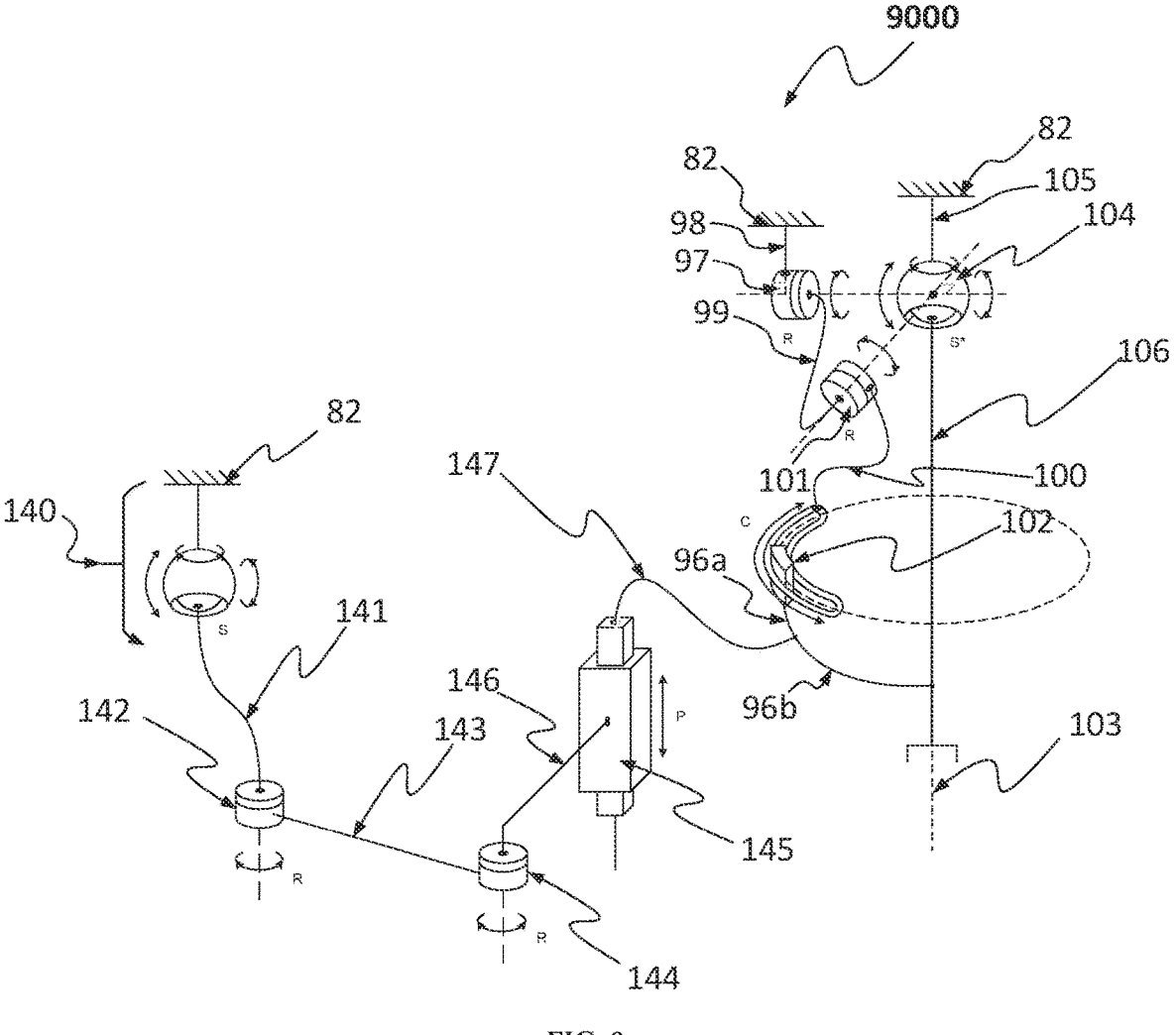
FIG. 9 is a mechanical schematic view of a motion guiding device showing a mechanical structure of one embodiment for a motion transfer system that connects a 3-DOF motion generator and a load bearing system where two adjacent rotary joints have parallel axes and form a four-bar mechanism with adjacent linkages. As labeled, 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIG. 9 illustrates a motion guiding device 9000 showing a mechanical structure of one embodiment for the motion transfer system 3. As already mentioned herein above, the motion transfer system 3 is used to transfer the 3-DOF motions generated by the motion generator 2 to the load bearing system 4 (or contribute to the actuation of the load bearing system 4 if the motion transfer system 3 includes actuators). In the illustrated embodiment of FIG. 9, the 3-DOF motions are transferred from one spherical joint or a joint system 140 (which may be any joint or joint system capable of 3-DOF rotational motion in the case that three DOFs of the target body 6b should be active) to another spherical joint such as a joint system 104 and the load bearing system 4. In such case, the joint or joint system 140 represents the 3-DOF motion generator 2, the components 96a, 97-102 represent the load bearing system 4, the components 104-106 represent the target body 6b (or the joint system) and the component 96b represents the target body interfacing system 6a. The load bearing system 4, target body interfacing system 6a, the motion transfer system 3 and the target body 6b depicted in FIG. 9 are similar to those depicted in FIG. 7. The motion transfer system 3 can in part comprise a linkage 141 connecting the motion generator 2 (the joint system 140) to a rotary joint 142. Another linkage 143 connects the rotary joint 142 to another rotary joint 144 which is connected to a prismatic joint 145 via a linkage 146. Another linkage 147 connects the prismatic joint 145 to the load bearing system 4 and, by extension, the attached target body 6b. In FIG. 9, the linkages are not meant to depict any special geometric relation between joint axes (e.g. perpendicularity, parallelism, etc.) except that the rotary joint 142 and the rotary joint 144 have parallel axes and thus form a four-bar mechanism with all adjacent linkages.

Figure 10:
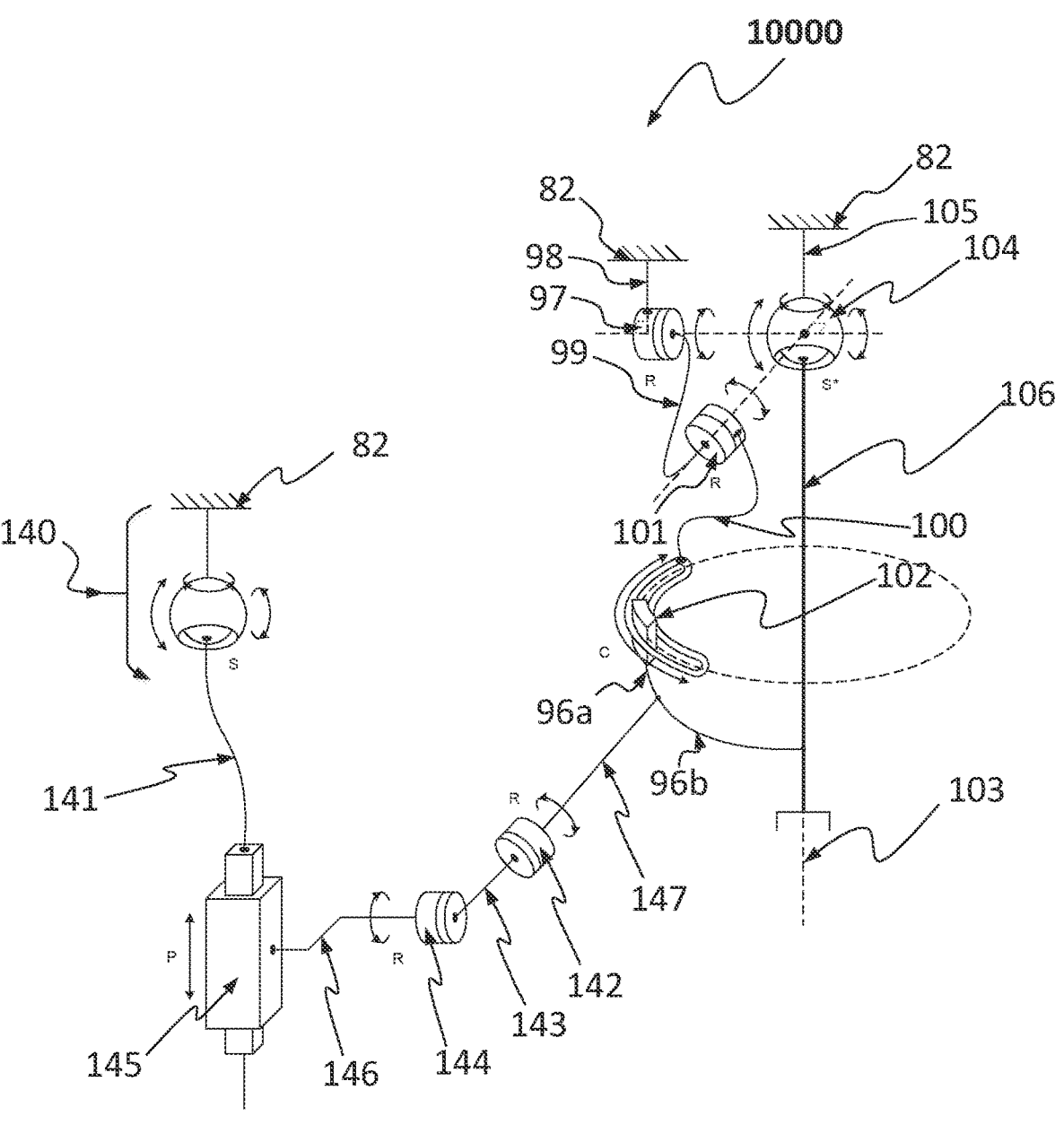
FIG. 10 is a mechanical schematic view of a motion guiding device showing a mechanical structure of another embodiment for a motion transfer system where two adjacent rotary joints are combined to form a 2-DOF universal joint and the axes of the two adjacent rotary joints are perpendicular. As labeled, 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIG. 10 illustrates a motion guiding device 10000 showing another embodiment of the motion transfer system 3 where the adjacent rotary joints 142 and 144 do not have parallel axes. For example, the rotary joints 142 and 144 can have perpendicular axes and the two adjacent rotary joints may or may not be combined to form a 2-DOF universal joint. In the illustrated example, the link 143 can have zero (or close to zero) length. Combining the joints by this method can achieve a more compact mechanical structure for the motion transfer system 3. The motion generator 2, load bearing system 4, target body interfacing system 3 and the target body 6b depicted in FIG. 10 are similar to those depicted in FIG. 9.

Figure 11:
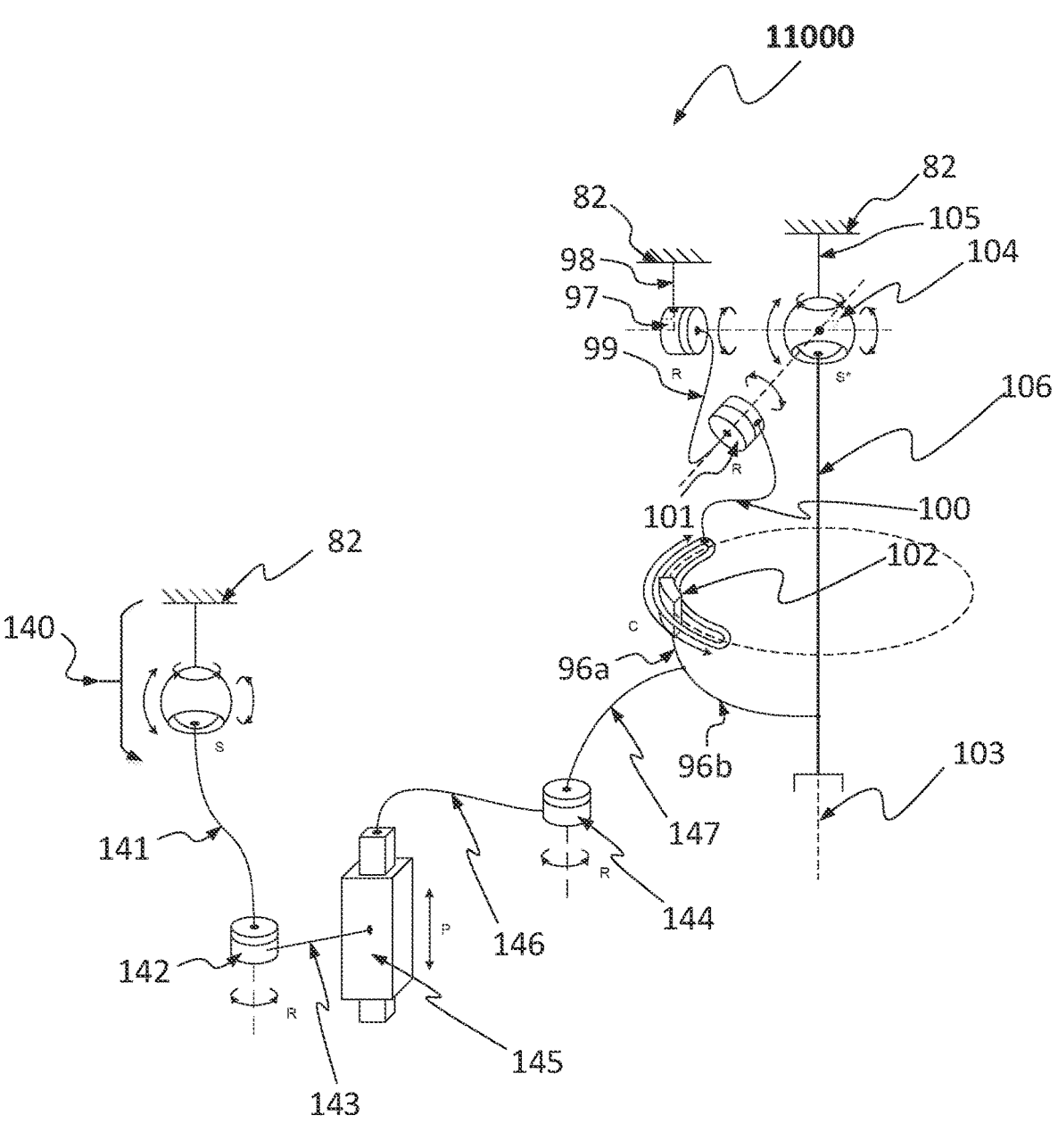
FIG. 11 is a mechanical schematic view of a motion guiding device showing the motion transfer system of FIG. 9 where placements of a rotary joint and a prismatic joint are being swapped compared to the motion transfer system illustrated in FIG. 9. As labeled, 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIG. 11 illustrates a device 11000 with a motion transfer system 3 similar to that of FIG. 9 except that the position of the rotary joint 144 and the prismatic joint 145 have been swapped (the motion generator 2, load bearing system 4, target body 6b and target body interfacing system 6a having remained the same) in order to create a more compact mechanical structure for some applications. Like the motion transfer system 3 illustrated in FIG. 10, the linkages illustrated in FIG. 11 are not meant to depict any special geometric relation between joint axes (e.g. perpendicularity, parallelism, etc.).

Figure 12:
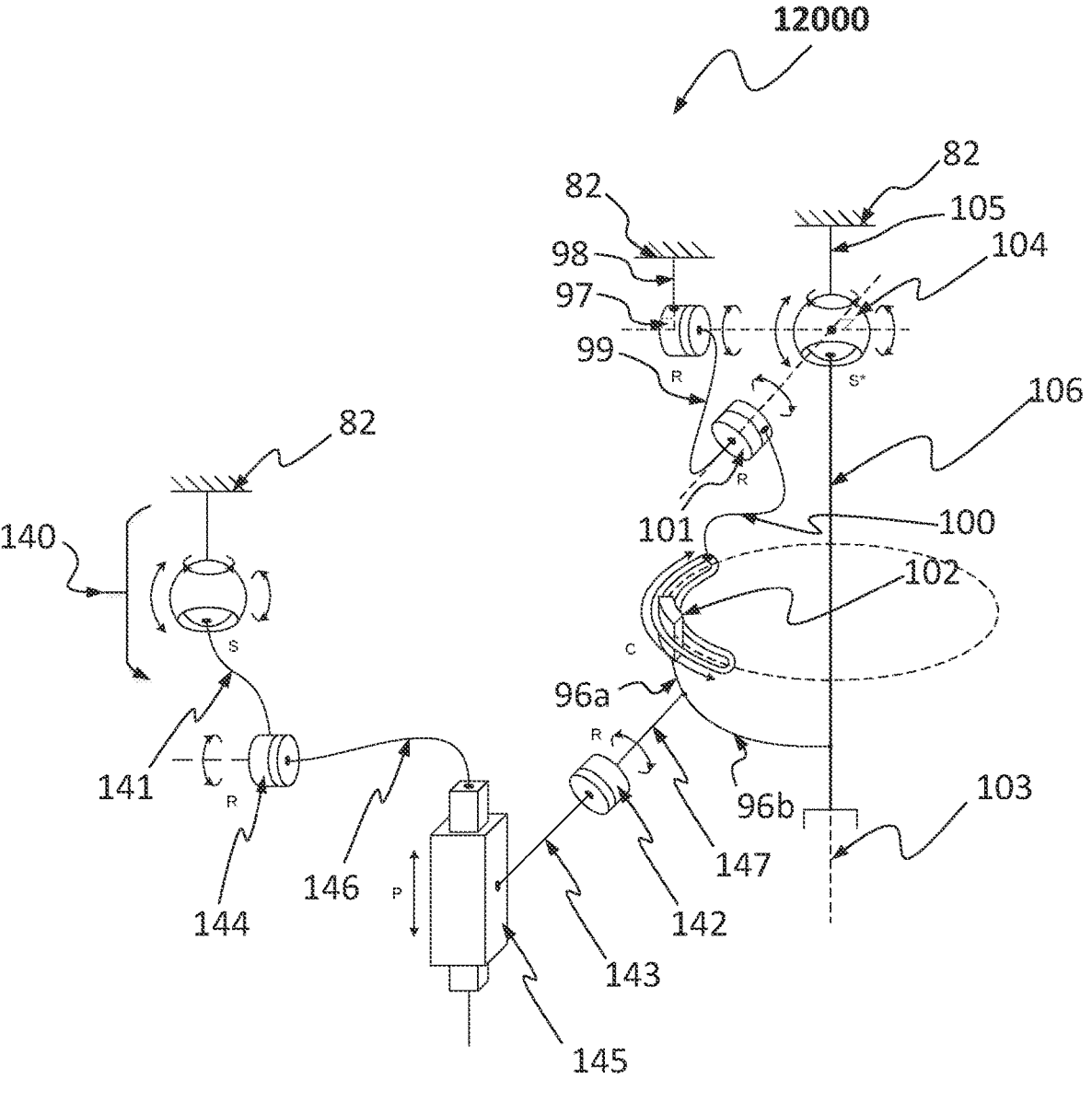
FIG. 12 is a mechanical schematic view of a motion guiding device showing the motion transfer system of FIG. 10 where placements of a rotary joint and a prismatic joint are being swapped compared to the motion transfer system illustrated in FIG. 10. As labeled, 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIG. 12 illustrates a motion guiding device 12000 showing a motion transfer system 3 similar to that of FIG. 10 with the placements of the rotary joint 144 and the prismatic joint 145 being swapped, the other elements of the motion generator 2, the load bearing system 4, target body interfacing system 6a and the target body 6b having remained the same.

Figure 13:
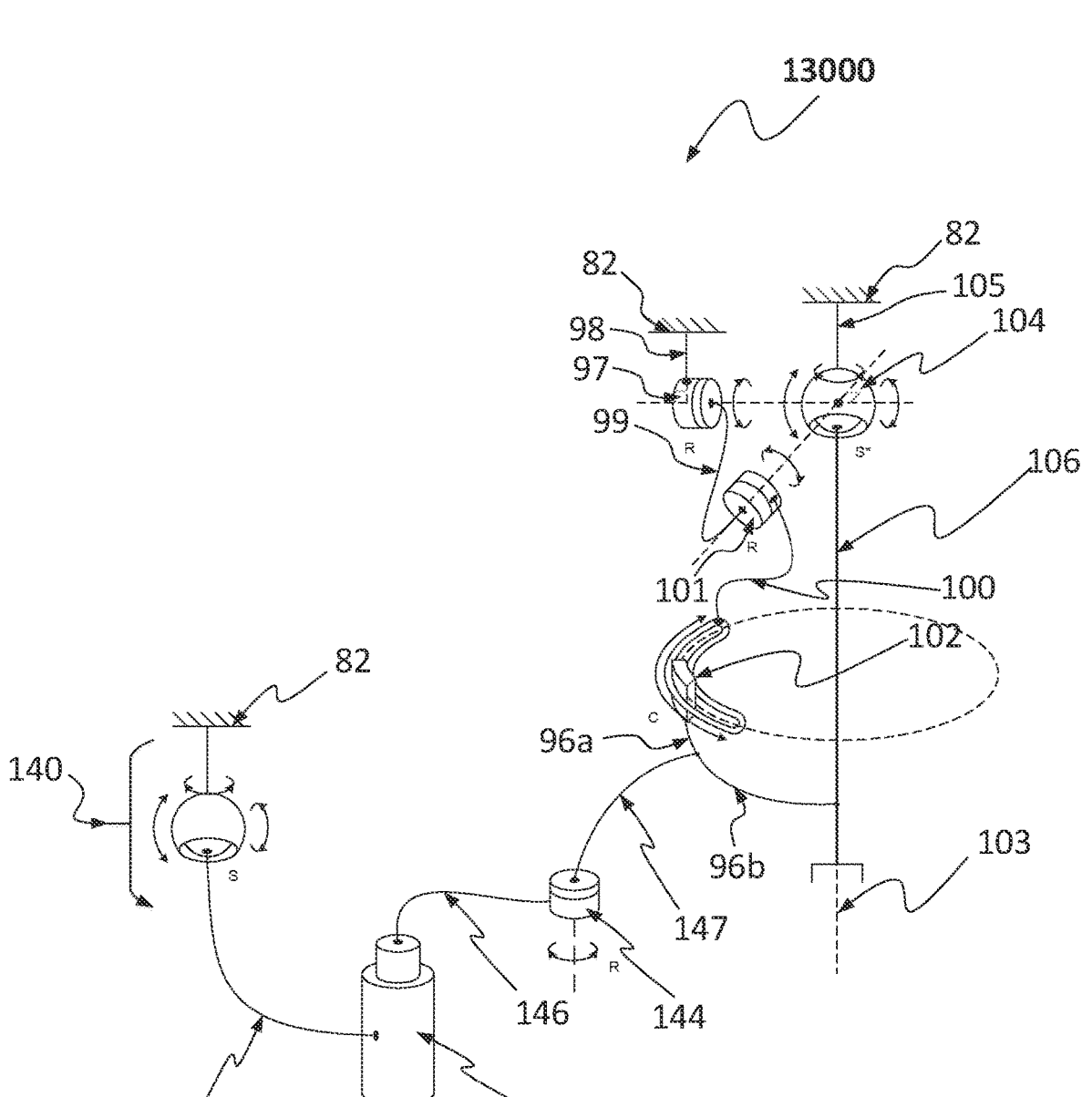
FIG. 13 is a mechanical schematic view of a motion guiding device showing the motion transfer system of FIG. 11 in which a rotary joint and a prismatic joint are combined as a cylindrical joint. As labeled, 'R' designates rotary joints, 'P' designates prismatic joints, 'S' designates ball-and-socket joints, 'C' designates curvilinear joints, underline designates active joints, no underline designates passive joints, and '*' designates the target joint for guidance.
Figure 14:
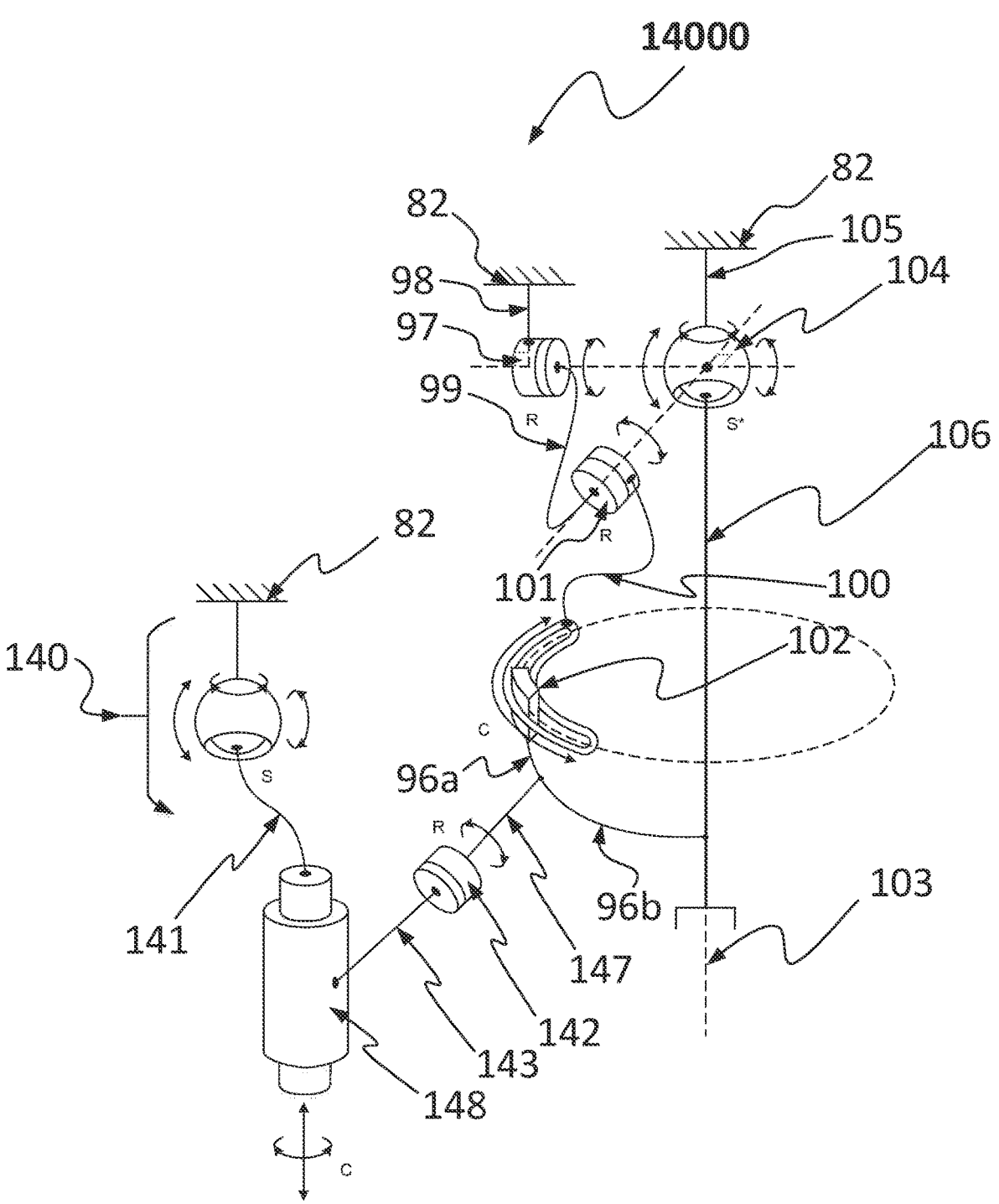
FIG. 14 is a mechanical schematic view of a motion guiding device showing the motion transfer system of FIG. 12 in which a rotary joint and a prismatic joint are combined as a cylindrical joint. As labeled, 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIGS. 13 and 14 each illustrate devices 13000 and 14000 (respectively) that include a motion transfer system 3 (the motion generator 2, load bearing system 4, target body 6b and target body interfacing system 6a having remained the same) similar to that of FIGS. 11 and 12 (respectively) where the length of the respective linkage 143, 146 is zero. With respect to the motion transfer system 3 of FIG. 13, the axes of the rotary joint 144 and the prismatic joint 145 are parallel, and the rotary joint 142 and the prismatic joint 145 are combined as a cylindrical joint 148 to increase the compactness and simplicity of the mechanical structure. Similarly, with respect to the motion transfer system 3 of FIG. 14, the axes of the rotary joint 142 and the prismatic joint 145 are parallel, and the rotary joint 144 and the prismatic joint 145 are combined as a cylindrical joint 148 to increase compactness and simplicity of the mechanical structure.

Figure 15:
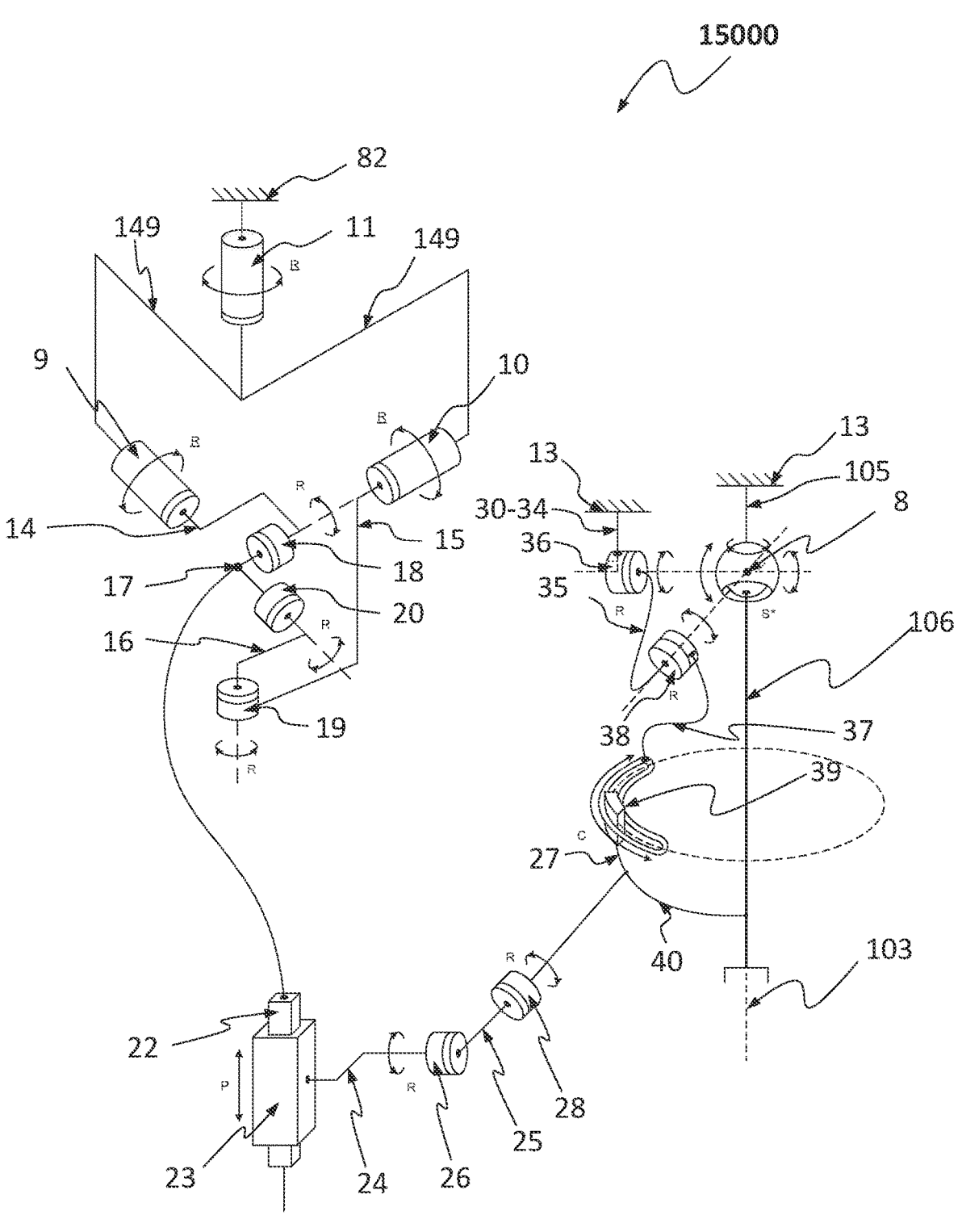
FIG. 15 is a mechanical schematic view of an example of a device for guiding motions of a passive 3-DOF target joint showing the motion generator of FIG. 6 in which a placement of one rotary actuator is moved between a base structure and the other two rotary actuators. As labeled, 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIG. 15 depicts an example of a device 15000 which is similar to the device 1000 for guiding 3-DOF motions of the target body 6b of FIG. 6 except that the placement of the rotary actuator 11 is moved between the base structure 13 and the rotary actuators 9 and 10 (the motion transfer system 3, load bearing system 4, target body 6b and target body interfacing system 6a having remained the same). Attendant to this adjustment is the introduction of a linkage 149, which connects an output shaft of the rotary actuator 11 to both rotary actuators 9 and 10.

Figure 16:
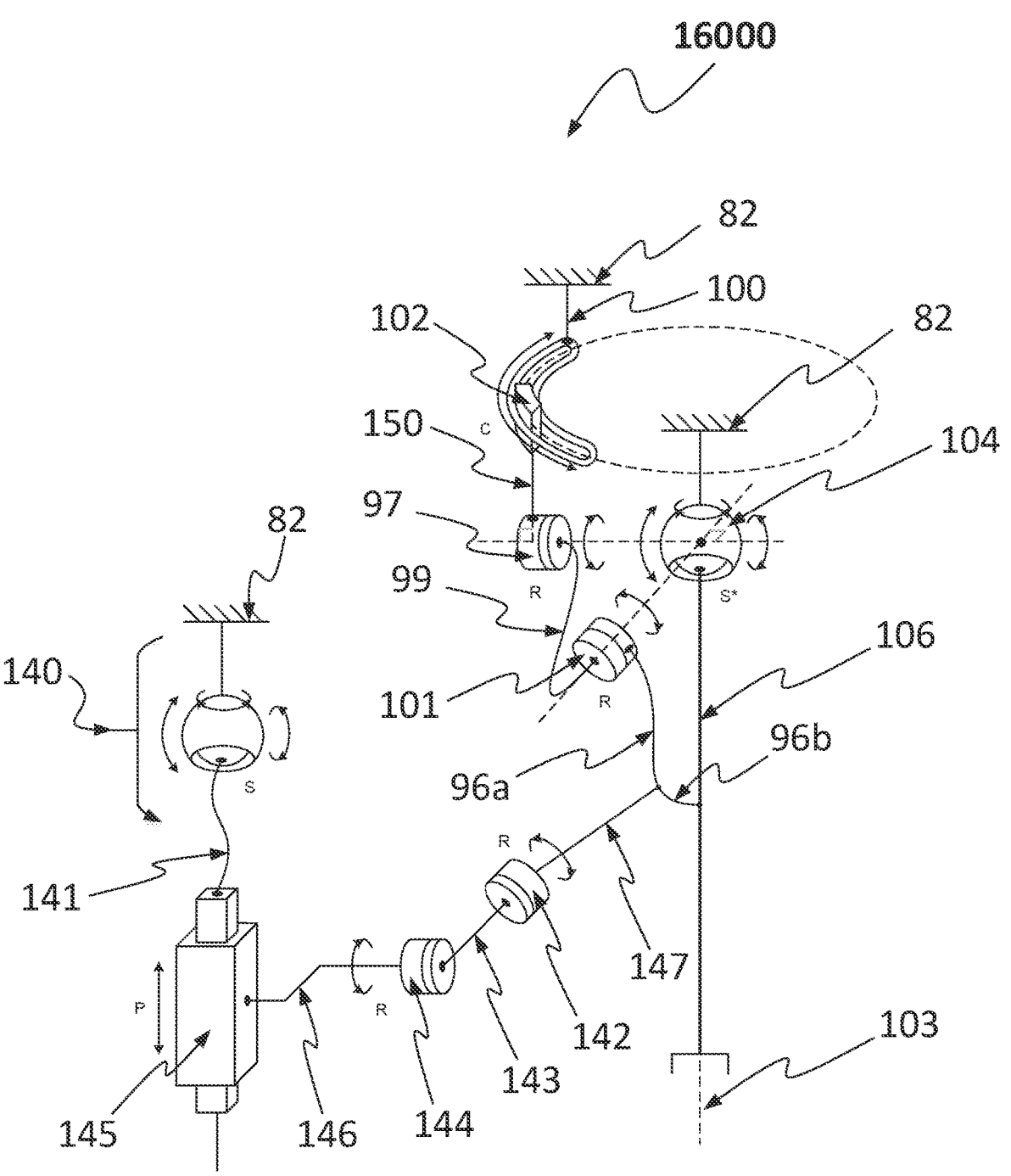
FIG. 16 is a mechanical schematic view of an example of a device for guiding motions similar to that of FIG. 10 where a curvilinear joint has been placed above the two rotary joints compared to the load bearing system unit illustrated in FIG. 10. As labeled, 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIG. 16 depicts an example of a device 16000 for guiding 3-DOF motions of the target body 6b similar to that illustrated in FIG. 10 except that the placement of a curvilinear joint 102 has been moved such that it is located above (closer to the base 82) the two rotary joints 97 and 101 (the motion generator 2, the motion transfer system 3, target body 6b and target body interfacing system 6a having remained the same). In this embodiment, the axes of rotation of the joints 97, 101 and the curvilinear joint 102 still intersect at the spherical joint 104. This configuration requires the addition of a link 150 to connect the curvilinear joint 102 and the rotary joint 97.

Figure 17:
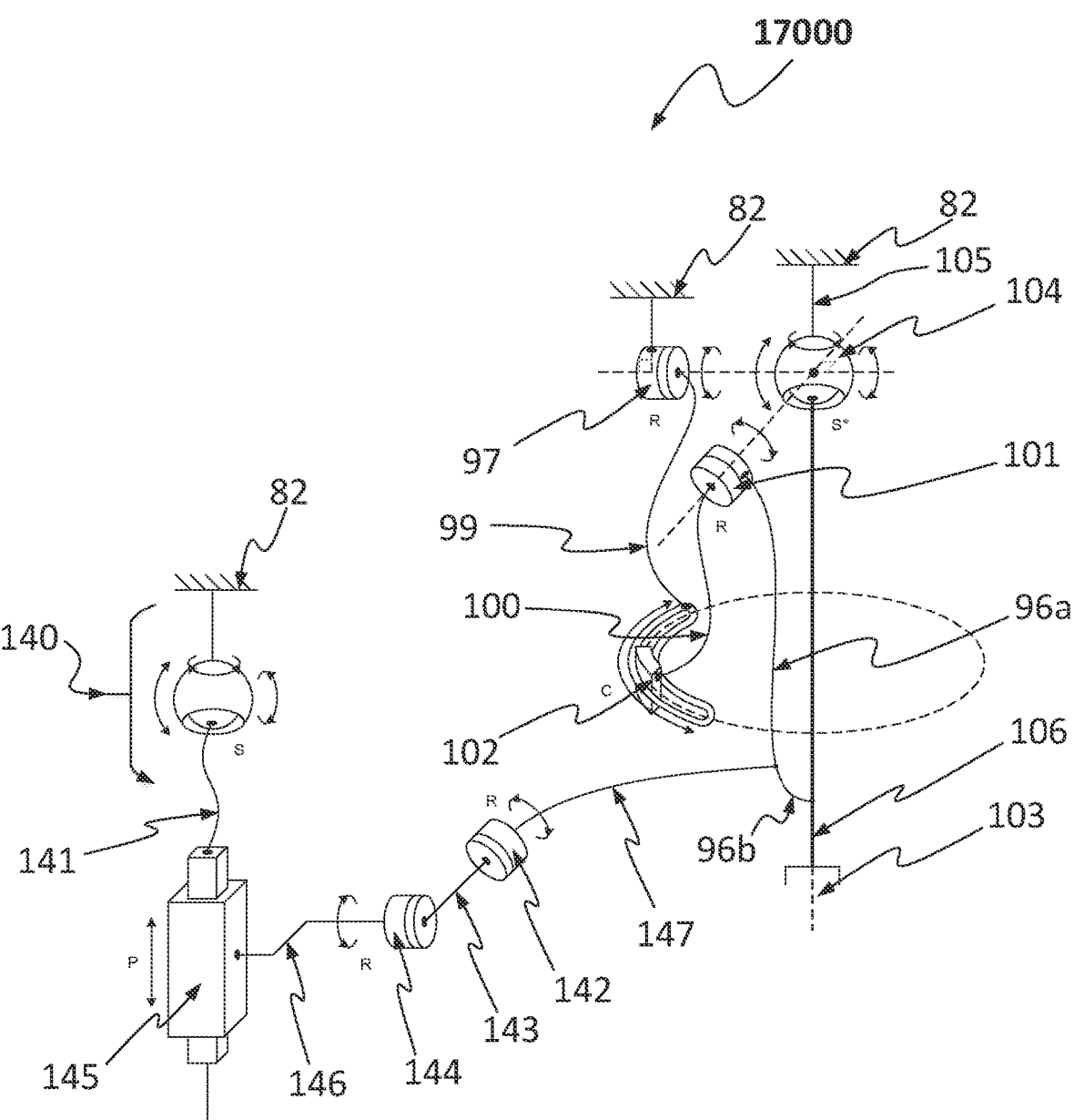
FIG. 17 is a mechanical schematic view of an example of a device for guiding motions similar to that of FIG. 10 where placements of a rotary joint and a curvilinear joint are being swapped compared to the load bearing system unit illustrated in FIG. 10. As labeled, 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIG. 17 depicts an example of a device 17000 for guiding 3-DOF motions of the target body 6b similar to that illustrated in FIG. 10 except that the placement of the curvilinear joint 102 has been moved such that it is between the rotary joint 97 and the rotary joint 101 (the motion generator 2, the motion transfer system 3, target body 6b and target body interfacing system 6a having remained the same). In this embodiment, the axes of rotation of the joints 97, 101 and the curvilinear joint 102 still intersect at a point that is coincident with the spherical joint 104.

Figure 18:
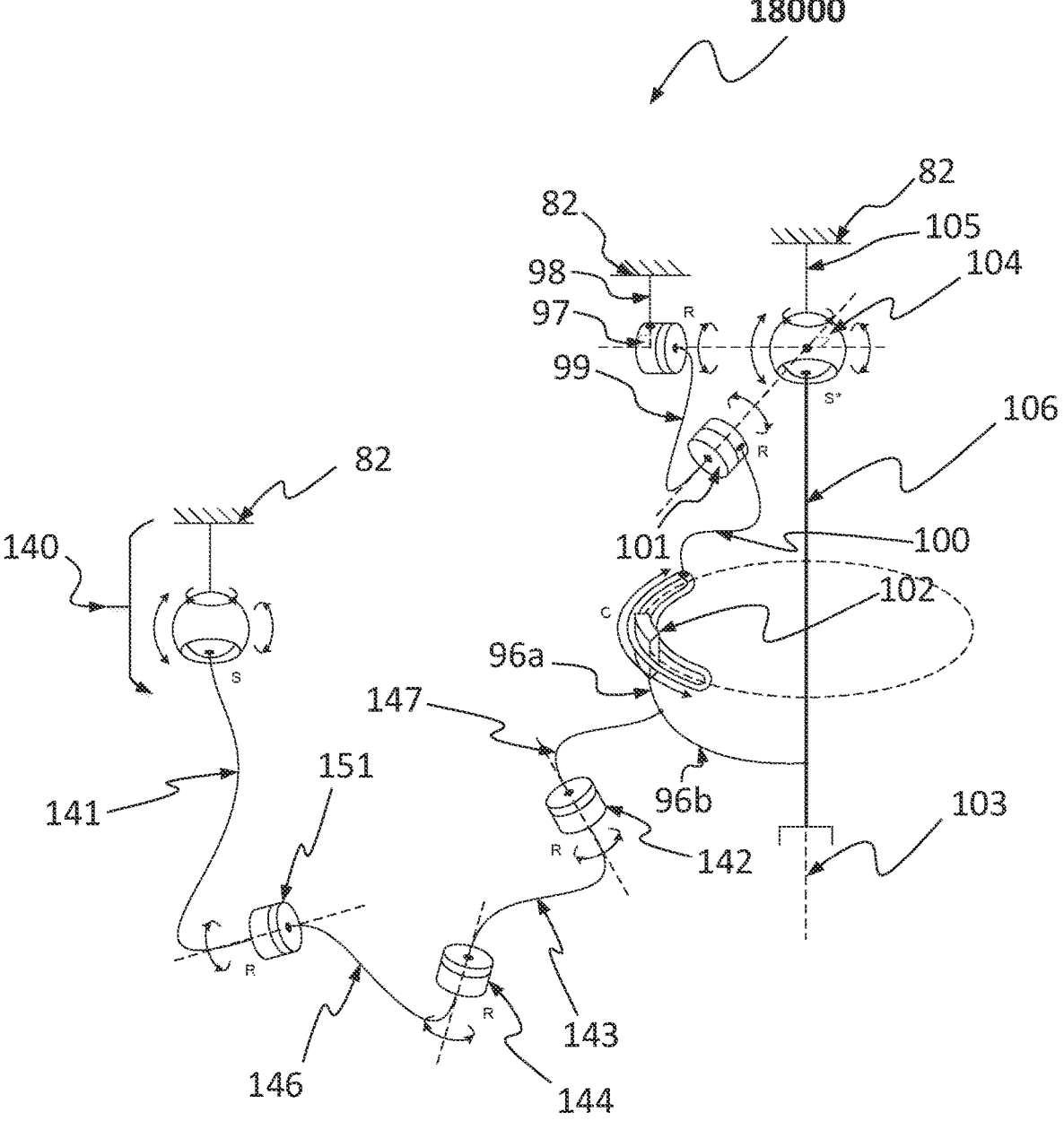
FIG. 18 is a mechanical schematic view of an example of a device for guiding motions similar to that of FIG. 10 except that a prismatic joint has been replaced by a rotary joint. As labeled, 'R' designates rotary joints, 'P' designates prismatic joints, 'S' designates ball-and-socket joints, 'C' designates curvilinear joints, underline designates active joints, no underline designates passive joints, and '*' designates the target joint for guidance.

FIG. 18 depicts a motion guiding device 18000 similar to that of FIG. 10 (the motion generator 2, the load bearing system 3, target body 6b and target body interfacing system 6a having remained the same) except that the prismatic joint 145 has been replaced by a rotary joint 151. In FIG. 18, the linkages 143 and 146 are not meant to depict any special geometric relation between the axes of rotary joints 142, 144 and 151. A person skilled in the art would understand that the adjacent joint pairs 142 and 144 and/or 144 and 151 can have orthogonal and intersecting axes, to thus form a universal joint, without departing from the scope of this disclosure.

A person skilled in the art would understand that motion guiding devices depicted in any of the FIGS. 7-18 could also be used as a component in the motion assistance system

3000 in place of the device 1000, without compromising its positioning functionality or its ability to transmit load.

In one implementation, any of the motion guiding devices disclosed herein can be used as components of a motion assistance system, such as an exoskeleton, that can be used to move the joints and the body segments of a user. The motion assistance system can comprise at least two of the motion guiding devices in communication with each other or any other joint to generate a coordinated movement of two or more different joints and body segments (targets). For example, a single controller can be used to control the movement of the two or more motion guiding devices 1000, 2000 interconnected to form the motion assistance system 3000. Additionally, if these motion guiding devices are attached rigidly, or by another self-supporting structure, the loads can be transmitted from one point on one mechanism to another point on a connected mechanism without necessarily transferring these loads through the body of a user. For example, in the event that several motion guiding devices 1000 are interconnected (as previously described) to actuate the arms and legs of a user, the weight of an object carried at the "hand" (referring to the manipulator arm of the exoskeleton as opposed to the user) of the exoskeleton device can potentially transfer this load to the ground without excessive load being transferred through the user's own body (reducing the possibility of damage to the user). The controller can identify user's intention based on the information obtained from the sensors of the motion detection and feedback systems and can then send the appropriate control signal to the drivers of the actuators of the motion generators, the motion transfer systems and/or load bearing systems (in cases where the motion transfer systems and/or load bearing systems include at least one actuator) to generate a specific motion. The input to the controller might be from the user's nervous system (e.g. via electroencephalograph), a voice recognition unit, feet contact force, a tracking system that can, for example, detect a predetermined head motion or eye tracking, etc. The controller can also use sensors (e.g. IMU sensors) input data to detect the balance of the user and to maintain it by providing proper triggering commands to the actuators. In one embodiment, the motion assistance system (i.e. the exoskeleton) can be equipped with an airbag or an active cushion system that can be deployed upon fall detection. The airbag can use conventional chemical reactions for inflation or can use other reversible methods such as compressed air, high speed fans, or compressible soft materials such as polyurethane foam. Any actuator, can be electric, pneumatic, hydraulic, etc. In case of electric actuators (e.g. electric motors), the motion assistance system (exoskeleton) can be battery powered and can be equipped with a battery and a power management circuit board. The motion assistance system can be configured to move the user to a safe body position, such as sitting or lying down, in case of emergency.

In one embodiment, the components of the exoskeleton can be rearranged to convert it to a motion guiding system for positioning another structure. One example of such application can be an orthopedic surgical system to assist a surgeon to position limbs in a desired orientation. The motion guiding device can be single device 1000, 2000 or a combination of two or more of such devices 1000, 2000 that are in communication or interconnected together. The motion guiding device can be fixed to an external fixture so that the moving platform (e.g. moving plate 86 in FIG. 7) of the actuators can be connected to the structure to be positioned via the motion transfer system 3 and the target body interfacing system 3. The desired position of the structure can then be achieved by commanding the system's actuator via its controller.

In another implementation, the motion assistance system of the present invention can be employed as a robotic rehabilitation tool. For example, a physiotherapist can secure a patient to the motion assistance exoskeleton system using straps (or any other attachment method) in order to support the weight of the user and can then program the exoskeleton to help patients' limb(s) through some repetitive exercises.

In one implementation, only one motion guiding device 1000, 2000 can be used instead of the lower limb exoskeleton, for example for ankle rehabilitation purposes. The therapists can monitor the progress of patients on site or remotely by receiving the processed data from the exoskeleton's controller. The data can be accessed by direct log into the controller or the data can be transferred to the therapists via wired/wireless data transfer. The therapist can also remotely modify the exercise set-up based on patients' progress.

In one implementation, the motion assistance system (e.g. which may include a modified form of any of the devices 1000, 2000) can be used as a motion capture device. The system can comprise a first motion guiding device for detecting and/or guiding motion of a first target joint and at least one additional motion guiding device for detecting and/or guiding motion of another target joint. The motion capture system is secured to a user using mounting means such as, for example, straps and orthotics. In this aspect, the actuators of the motion generator and the motion transfer system (if any) may or may not be present. For example, the actuators can be replaced by sensors, e.g. encoders, linear/rotary potentiometers, etc., and a kinematic algorithm programmed in the controller can use the data to calculate the accurate orientation of the human target joints and the body segments' position. The user can produce a motion to any or all of the joint targets and the plurality of sensors can detect such motion (produced by the user) by measuring the motion (i.e. position and orientation) of the passive joints of the motion capturing system.

Alternatively, in another embodiment, the active joints of the motion guiding devices 1000, 2000 and the controller(s) 1 may not be omitted (in comparison to the previously described motion capturing system) and the device 1000 can communicate with an external Virtual Reality (VR) or an Augmented Reality (AR) system. An additional controller can be in communication with the first motion guiding and detecting device and the at least one additional motion guiding and detecting device to coordinate guidance of the multiple targets. The motion detection and feedback system(s) can be in communication with the external virtual or augmented reality systems. In this case, the actuators do not create any resistance until the user tactilely contacts something in the virtual or augmented reality environment, at which time the actuators engage to emulate a tactile response (e.g. force feedback) to a virtual entity. For example, this embodiment can be applied in the gaming industry where a gamer may need to have a better interaction with the environment. The controller can be pre-programmed to command the actuators to resist motions in certain directions/orientations or to apply forces in certain directions/orientations. The motion guiding device 1000, 2000 can also be used in training applications, such as sports, where inaccurate/incorrect motions will be restricted while the accurate/correct motions will be facilitated (or not interfered) by the exoskeleton.

In another embodiment, the actuators can be replaced by lockable joints. In this arrangement, an operator can manually move the structure to be positioned until the desired position is achieved while the motion guiding device is attached. The actuators will not create any resistance against the motion until the desired position is reached. The operator can then lock the lockable joints to maintain the position.

In another embodiment, the full body exoskeleton or its subcomponents, e.g. hip subcomponent, can be used as a fall prevention or balance recovery device, where the controller can comprise a fall detection algorithm which can monitor the user's gait and balance via signals received from sensors, such as one or more encoders, IMU systems, foot force sensors etc. The controller will then command the exoskeleton or its subcomponents to force the lower body to move into a position which increases the balance stability of the user. The system can be active or passive during other normal mobility actions.

In another embodiment, the full body exoskeleton or its subcomponents, e.g. hip subcomponent, can be used as a motion augmentation device, where the controller can comprise a user intent detection algorithm which can monitor the users activity/input via signals received from sensors, such as one or more encoders, IMU systems, foot force sensors, EMG sensors etc. The controller will then command the exoskeleton or its subcomponents to assist the lower or upper body in performing particular motions. The system can be active or passive as needed for a particular action.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example results and parameters of the embodiments described herein are intended to illustrate and not to limit the disclosed embodiments. Other embodiments can be configured and/or operated differently than the illustrative examples described herein.

The invention claimed is:

1. A self-supported device for guiding motions of a target joint of a target body, the device comprising:
   a base structure;
   a motion generator connected to the base structure, the motion generator comprising a network of joints and linkages, the base structure rigidly supporting the motion generator;
   a motion transfer system comprising at least one linear-motion joint;
   a load bearing system connected to the base structure, the load bearing system comprising a structure that includes at least a moving plate connected to the motion transfer system, and a network of joints and links of the load bearing system configured to constrain and/or actuate the plate to rotate about a center of rotation of the load bearing system, the structure of the load bearing system being configured to support structural loads and transfer the structural loads through the device, the network of joints and links of the load bearing system comprising at least two joints which are selected from either at least two rotary joints, or a curvilinear joint and at least one rotary joint, wherein the axes of the at least two joints intersect at a center of rotation, and the network of joints and links further comprising a first link connected to the base structure and a second link of the network of links, the second link is connected to the first link via one of the at least two joints and is connected to a third link of the network of links via another of the at least two joints; and the third link of the network of links is connected to the moving plate; and
   a target interface system connected to the moving plate of the load bearing system and configured to be mounted to the target body;
   wherein the motion transfer system is connected to the motion generator at one end, and to the load bearing system at an opposite end, and wherein the center of rotation of the load bearing system approximately corresponding to a center of rotation of the target joint of the target body; and wherein the moving plate of the load bearing system rotates with two DOFs about the center of rotation of the load bearing system.

2. The self-supported device of claim 1 further comprising at least one actuator and at least one driver in communication with the at least one actuator, a controller comprising an input unit, an output unit and a processing unit, the controller sending output signals to command the at least one driver of the at least one actuator.

3. The self-supported device of claim 2, wherein the motion transfer system converts a motion actuated by the at least one actuator to the load bearing system and provides corresponding rotational motion of the at least one DOF of the load bearing system and through the target interfacing system to the target joint of the target body.

4. The self supported device of claim 2, wherein the motion generator is active and the at least one actuator is positioned within the motion generator.

5. The self-supported device of claim 4, wherein the motion transfer system and/or the load bearing system further comprise at least one additional actuator, an additional driver being in communication to the at least one additional actuator.

6. The self-supported device of claim 5, wherein the output unit of the controller sending signals to the driver of at least one additional actuator.

7. The self supported device of claim 2, wherein the motion generator is passive, the at least one actuator is positioned within the load bearing system or the motion transfer system.

8. The self-supported device of claim 2, wherein the at least one actuator and the at least one driver are positioned remotely from the self-supported device, the motion transfer system comprising a pulley-cable system to transfer motions of the at least one actuator to the load bearing system, the driver being in communication with the at least one actuator by wired connection.

9. The self-supported device of claim 8, wherein the at least one driver of the at least one actuator is in communication with the controller by wired connections or wirelessly.

10. The self-supported device of claim 2, further comprising a motion detection and feedback system that comprises a plurality of sensors to measure a position and/or orientation of the link and joint networks of the motion generator or the load bearing system and/or the at least one actuator of the self-supported device, as well as the forces and/or torques acting between the links and joints network and/or the at least one actuator and the forces and/or torques acting between the self-supported device and the self-supported device's environment, the controller and/or the driver being in communication with the motion detection and feedback system to receive the signals from the plurality of sensors.

11. The self-supported device of claim 1 further comprising a controller and a motion detection and feedback system that comprises a plurality of sensors to measure a position and/or orientation of the network of joints and links, as well as the forces and/or torques acting between the network of joints and links and the forces and/or torques acting between the self-supported device and the self-supported device's environment, the controller being in communication with the motion detection and feedback system to receive signals from the plurality of sensors wherein the motion detection and feedback system acts as a motion capture device.

12. The self-supported device of claim 1, wherein a position of the center of rotation of the load bearing system being adjustable by adjusting a connection point between the links of the load bearing system such that the center of rotation of the load bearing system approximately corresponds to a center of rotation of the target joint of the target body.

13. The self-supported device of claim 1, wherein the structure of the load bearing system is a passive structure.

14. The self-supported device of claim 1, wherein the motion transfer system further comprises at least one rotary joint, and a network of linkages connecting the at least one rotary joint and the at least one linear-motion joint.

15. The self-supported device of claim 1, wherein the target interfacing system is adjustable to allow connection between the load bearing system and the target body to be flexible and compliant without restricting rotational motion of either the load bearing system or the target joint of the target body.

16. A motion assistance system, the system comprising:
the self-supported device for guiding motions of the target joint as claimed in claim 1; and
at least one additional joint system connected in series to the self-supported device to allow an additional at least one DOF corresponding to at least one additional target joint, the at least one additional joint system being connected to the base structure or the plate of the load bearing system of the self-supported device, a position of a connection between the self-supported device and the additional joint system being adjustable, the at least one additional joint system comprising a network of links, a connection point between some of the links being adjustable to adjust a position of the at least one additional joint system with respect to the self-supported device.

17. The motion assistance system of claim 16, wherein the one additional joint system is a rotary joint system.

18. The motion assistance system of claim 16 further comprising at least one additional self-supported device for allowing motions of at least one additional target joint.

19. The motion assistance system of claim 18 comprising at least one additional joint system connected in series with the at least one additional self-supported device to allow an additional two or more DOFs at the additional target joints.

20. The motion assistance device according to claim 16 further comprising at least one actuator to actuate at least one DOF and at least one driver in communication with the at least one actuator; a controller comprising an input unit, an output unit and a processing unit, the controller sending output signals to command the at least one driver of the at least one actuator.

21. The motion assistance device according to claim 20 further comprising a motion detection and feedback system that comprises a plurality of sensors to measure a position and/or orientation of the links and joints networks and/or the at least one actuator, as well as the forces and/or torques acting between the links and joint networks and/or the at least one actuators and the forces and/or torques acting between the motion assistance device and the self-supported device's environment, the controller and/or the driver being in communication with the motion detection and feedback system to receive the signals from the plurality of sensors.

22. The motion assistance device of claim 16 further comprising a controller and a motion detection and feedback system that comprises a plurality of sensors to measure a position and/or orientation of the networks of joints and links of the motion generator and/or the load bearing system, as well as the forces and/or torques acting between the networks of joints and links and the forces and/or torques acting between the self-supported device and the self-supported device's environment, the controller being in communication with the motion detection and feedback system to receive signals from the plurality of sensors wherein the motion detection and feedback system acts as a motion capture device.

23. The motion assistance device according to claim 22, wherein the motion detection and feedback system additionally comprises a machine vision device that is in communication with the controller.

24. The motion assistance system according to claim 16 further comprising at least one additional self-supported device for allowing motions of at least one additional target joint which comprises at least one additional actuator for actuating an additional at least one DOF, a controller being in communication with the at least one additional self-supported device and/or systems to coordinate their movements.

25. A self-supported device for guiding motions of a target joint of a target body, the device comprising:
a base structure;
a motion generator connected to the base structure, the motion generator comprising a network of joints and linkages, the base structure rigidly supporting the motion generator;
a motion transfer system comprising at least two rotary joints, wherein axes of rotation of the at least two rotary joints are not parallel;
a load bearing system connected to the base structure, the load bearing system comprising a structure that includes at least a moving plate connected to the motion transfer system, and a network of joints and links of the load bearing system configured to constrain and/or actuate the plate to rotate about a center of rotation of the load bearing system, the structure of the load bearing system being configured to support structural loads and transfer the structural loads through the device, the network of joints and links of the load bearing system comprising at least two joints which are selected from either at least two rotary joints, or a curvilinear joint and at least one rotary joint, wherein the axes of the at least two joints intersect at a center of rotation, and the network of joints and links further comprising a first link connected to the base structure and a second link of the network of links, the second link is connected to the first link via one of the at least two joints and is connected to a third link of the network of links via another of the at least two joints; and the third link of the network of links is connected to the moving plate; and
a target interface system connected to the moving plate of the load bearing system and configured to be mounted to the target body;
wherein the motion transfer system is connected to the motion generator at one end, and to the load bearing system at an opposite end, and wherein the center of rotation of the load bearing system approximately corresponding to a center of rotation of the target joint of the target body; and wherein the moving plate of the load bearing system rotates with two DOFs about the center of rotation of the load bearing system.

26. The self-supported device of claim 25, wherein axes of rotation of the at least two rotary joints are perpendicular.

27. The self-supported device of claim 25, wherein the motion transfer system further comprising at least one linear-motion joint and a network of linkages connecting the at least one linear-motion joint to the at least two rotary joints.

28. The self-supported device of claim 25 further comprising at least one actuator and at least one driver in communication with the at least one actuator, a controller comprising an input unit, an output unit and a processing unit, the controller sending output signals to command the at least one driver of the at least one actuator.

29. The self-supported device of claim 25 further comprising a controller and a motion detection and feedback system that comprises a plurality of sensors to measure a position and/or orientation of the networks of joints and links of the motion generator and/or the load bearing system, as well as forces and/or torques acting between the networks of joints and links and the forces and/or torques acting between the self-supported device and the self-supported device's environment, the controller being in communication with the motion detection and feedback system to receive signals from the plurality of sensors wherein the motion detection and feedback system acts as a motion capture device.

30. A motion assistance system, the system comprising:

the self-supported device for guiding motions of the target joint as claimed in claim 25; and at least one additional joint system connected in series to the self-supported device to allow an additional at least one DOF corresponding to at least one additional target joint, the at least one additional joint system being connected to the base structure or the plate of the load bearing system of the self-supported device, a position of a connection between the self-supported device and the additional joint system being adjustable, the at least one additional joint system comprising a network of links, a connection point between some of the links being adjustable to adjust a position of the at least one additional joint system with respect to the self-supported device.

* * * * *